US010336328B2

United States Patent
Yoon et al.

(10) Patent No.: US 10,336,328 B2
(45) Date of Patent: Jul. 2, 2019

(54) CRUISE CONTROL SYSTEM, VEHICLE INCLUDING THE SAME, METHOD OF CONTROLLING THE CRUISE CONTROL SYSTEM

(71) Applicants: Hyundai Motor Company, Seoul (KR); Kia Motors Corporation, Seoul (KR)

(72) Inventors: Dong Pil Yoon, Incheon (KR); Howon Seo, Gyeonggi-do (KR); Jungwook Kim, Geonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 202 days.

(21) Appl. No.: 15/592,748

(22) Filed: May 11, 2017

(65) Prior Publication Data

US 2018/0201262 A1    Jul. 19, 2018

(30) Foreign Application Priority Data

Jan. 16, 2017  (KR) .......................... 10-2017-0006990

(51) Int. Cl.
    *B60W 30/14* (2006.01)
    *B60W 10/06* (2006.01)
    *B60W 10/10* (2012.01)

(52) U.S. Cl.
    CPC .......... *B60W 30/143* (2013.01); *B60W 10/06* (2013.01); *B60W 10/10* (2013.01); *B60W 2550/142* (2013.01); *B60W 2710/0661* (2013.01); *B60W 2710/1005* (2013.01)

(58) Field of Classification Search
    CPC .... B60W 10/06; B60W 10/10; B60W 30/143; B60W 2550/142
    See application file for complete search history.

(56) References Cited

U.S. PATENT DOCUMENTS

| 5,832,400 A | * | 11/1998 | Takahashi | B60K 31/00 701/53 |
| 2011/0276216 A1 | * | 11/2011 | Vaughan | B60W 10/06 701/31.4 |
| 2015/0197247 A1 | * | 7/2015 | Ichinokawa | B60W 30/143 701/93 |
| 2016/0325744 A1 | * | 11/2016 | Yang | B60W 10/06 |

FOREIGN PATENT DOCUMENTS

KR    20150146532    6/2017

* cited by examiner

*Primary Examiner* — Edwin A Young
(74) *Attorney, Agent, or Firm* — Mintz Levin Cohn Ferris Glovsky and Popeo, P.C.; Peter F. Corless

(57) ABSTRACT

A cruise control system, the vehicle including the same, and the method of controlling the cruise control system are provided to improve fuel efficiency by changing control target vehicle speeds by continuously predicting vehicle speeds and variations in required driving forces on roads with various slope variations. Additionally, driving performance is improved by using kinetic energies and preventing unnecessary acceleration and deceleration in comparison with conventional vehicles. Driver convenience and satisfaction is also improved by preventing an unintended operation stop of the cruise control system caused by frequent acceleration and deceleration on roads with substantial slope variations in advance and by preventing unintended acceleration/deceleration on roads with frequent slope variations.

20 Claims, 23 Drawing Sheets

FIG. 4

| Index | 1 | 2 | 3 |
|---|---|---|---|
| SLOPE | DOWNHILL ROAD | FLATLAND | UPHILL ROAD |
| CURVATURE | LEFT CURVE | STRAIGHT LINE | RIGHT CURVE |

FIG. 5

| TYPE<br>27 TYPES<br>(3^3) | 111 | 121 | 131 | 211 | 221 | 231 | 311 | 321 | 331 |
| --- | --- | --- | --- | --- | --- | --- | --- | --- | --- |
| | 112 | 122 | 132 | 212 | 222 | 232 | 312 | 322 | 332 |
| | 113 | 123 | 133 | 213 | 223 | 233 | 313 | 323 | 333 |

FIG.6

| TYPE 21 TYPES | 1 | 121 | 131 | 21 | | 231 | 31 | 321 | - |
|---|---|---|---|---|---|---|---|---|---|
| | 12 | | 132 | 212 | 2 | 232 | 312 | 32 | |
| | 13 | 123 | - | 213 | | 23 | 313 | 323 | 3 |

CRUISE CONTROL SYSTEM, VEHICLE INCLUDING THE SAME, METHOD OF CONTROLLING THE CRUISE CONTROL SYSTEM

CROSS-REFERENCE TO RELATED APPLICATION(S)

This application claims the benefit of Korean Patent Application No. 10-2017-0006990, filed on Jan. 16, 2017 in the Korean Intellectual Property Office, the disclosure of which is incorporated herein by reference.

BACKGROUND

1. Field of the Disclosure

The present disclosure relates to a cruise control system to control a steady speed of a vehicle, a vehicle including the same, and a method of controlling the cruise control system that improve fuel efficiency and driving performance.

2. Description of the Related Art

Recently, cruise control systems have been provided in vehicles for driver convenience. A cruise control system controls a vehicle to travel at a constant speed set by a driver, e.g., at 100 kph, on high-ways or roads for the exclusive use of vehicles by automatically adjusting amounts of air and a fuel without engaging an acceleration pedal and includes cruise control (CC), advanced cruise control (ACC), smart cruise control (SCC), and the like. In other words, when a vehicle is traveling at a speed desired by a driver, the driver may select a constant speed driving switch to set a current vehicle speed as a target vehicle speed for constant driving. Then, the cruise control system compares the target vehicle speed with an actual vehicle speed and adjusts a throttle position based on a difference therebetween to adjust the actual vehicle speed to correspond to the target vehicle speed.

The cruise control system may increase fuel efficiency on flat roads with minimal slope variations in comparison with driving of the driver. However, in uphill roads or downhill roads with slope variations (e.g., inclined roads), an actual vehicle speed exceeds a target vehicle speed by an allowable variation (e.g., uphill: −4 kph, downhill: +4 kph). In particular, CC operation is stopped. For ACC (or SCC) operation, a current vehicle speed corresponds a set target vehicle speed by increasing a required degree of acceleration (or driving torque) when a vehicle speed variation is negative (low) and increasing a required degree of deceleration (or braking torque) when the vehicle speed variation is positive (high). However, fuel efficiency and driving performance may deteriorate due to frequent acceleration or deceleration control to maintain the set target vehicle speed.

SUMMARY

Therefore, an aspect of the present disclosure provides a cruise control system to improve fuel efficiency and driving performance using advanced driver assistance system (ADAS) map information, a vehicle including the same, and a method of controlling the cruise control system. Additional aspects of the disclosure will be set forth in part in the description which follows and, in part, will be obvious from the description, or may be learned by practice of the disclosure.

In accordance with an aspect of the present disclosure, a cruise control system may include: a road model transmission unit configured to analyze map information of a driving route and output a slope model of three consecutive forward sections; a vehicle speed controller configured to set a control target vehicle speed using slopes of the three consecutive forward sections and section distances received from the road model transmission unit; and a speed-following controller configured to receive a request for acceleration or deceleration and gear-shifting from the vehicle speed controller and maintain the set control target vehicle speed.

The road model transmission unit is a navigation device configured to calculate a linearly simplified road model using information regarding a geometric structure of a road (X, Y, and Z coordinates) of an advanced driver assistance system (ADAS) map on a driving route and output a road model of three consecutive forward sections. The vehicle speed controller may be configured to transmit a signal to execute acceleration or deceleration and gear-shifting to the speed-following controller to reach and maintain the set control target vehicle speed.

The vehicle speed controller may be configured to set a control target vehicle speed of an (n+1)th section based on a slope variation ($\Delta Slope_{n+1, n}$) between an nth section and the (n+1) section and a control target vehicle speed of an (n+2)th section based on a slope variation ($\Delta Slope_{n+2, n+1}$) between the (n+1)th section and the (n+2)th section using information regarding three consecutive forward sections (nth section, (n+1)th section, and (n+2)th section) received from the road model transmission unit. The vehicle speed controller may be configured to set the control target vehicle speed to be less than that of a previous section when a slope variation between two sections is positive (+) and the control target vehicle speed to be greater than that of the previous section when the slope variation between the two sections is negative (−).

The vehicle speed controller may further be configured to calculate a slope variation ($\Delta Slope_{n+1, n}$) between an nth section and an (n+1) section using information regarding three consecutive forward sections (nth section, (n+1)th section, and (n+2)th section) received from the road model transmission unit and decrease the control target vehicle speed of the (n+1)th section by setting the control target vehicle speed of the (n+1)th section to be less than a target vehicle speed of the nth section when the calculated slope variation ($\Delta Slope_{n+1, n}$) is greater than 0.

Further, the vehicle speed controller may be configured to compensate the control target vehicle speed of the (n+1)th section when a negative (−) slope variation ($\Delta Slope_{n+1, n}$) of the (n+1)th section is less than a predetermined value. The vehicle speed controller may be configured to calculate a slope variation ($\Delta Slope_{n+1, n}$) between an nth section and an (n+1) section using information regarding three consecutive forward sections (nth section, (n+1)th section, and (n+2)th section) received from the road model transmission unit and maintain the control target vehicle speed of the (n+1)th section by setting the control target vehicle speed of the (n+1)th section to be the same as a target vehicle speed of the nth section when the calculated slope variation ($\Delta Slope_{n+1, n}$) is 0.

The vehicle speed controller may be configured to calculate a slope variation ($\Delta Slope_{n+1, n}$) between an nth section and an (n+1) section using information regarding three consecutive forward sections (nth section, (n+1)th section, and (n+2)th section) received from the road model transmission unit and increase the control target vehicle speed of the (n+1)th section by setting the control target vehicle speed of the (n+1)th section to be greater than a target vehicle speed of the nth section when the calculated slope variation ($\Delta Slope\_{n+1,\ n}$) is less than 0.

Additionally, the vehicle speed controller may be configured to compensate the control target vehicle speed of the (n+1)th section when a positive (+) slope variation ($\Delta Slope\_{n+1,\ n}$) of the (n+1)th section is greater than a predetermined value. The vehicle speed controller may be configured to calculate a slope variation ($\Delta Slope\_{n+2,\ n+1}$) between an (n+1)th section and an (n+2)th section using information regarding three consecutive forward sections (nth section, (n+1)th section, and (n+2)th section) received from the road model transmission unit and decrease the control target vehicle speed of the (n+2)th section by setting the control target vehicle speed of the (n+2)th section to be less than a target vehicle speed of the (n+1)th section when the calculated slope variation ($\Delta Slope\_{n+2,\ n+1}$) is greater than 0.

The vehicle speed controller may be configured to calculate a slope variation ($\Delta Slope\_{n+2,\ n+1}$) between an (n+1)th section and an (n+2)th section using information regarding three consecutive forward sections (nth section, (n+1)th section, and (n+2)th section) received from the road model transmission unit and maintain the control target vehicle speed of the (n+2)th section by setting the control target vehicle speed of the (n+2)th section to be the same as a target vehicle speed of the (n+1)th section when the calculated slope variation ($\Delta Slope\_{n+2,\ n+1}$) is 0. Additionally, the vehicle speed controller may be configured to calculate a slope variation ($\Delta Slope\_{n+2,\ n+1}$) between an (n+1)th section and an (n+2)th section using information regarding three consecutive forward sections (nth section, (n+1)th section, and (n+2)th section) received from the road model transmission unit and increase the control target vehicle speed of the (n+2)th section by setting the control target vehicle speed of the (n+2)th section to be greater than a target vehicle speed of the (n+1)th section when the calculated slope variation ($\Delta Slope\_{n+2,\ n+1}$) is less than 0.

In accordance with another aspect of the present disclosure, a cruise control system may include: a road model transmission unit configured to calculate a linearly simplified road model using map information of a driving route and output a slope model of three consecutive forward sections (nth section, (n+1)th section, and (n+2)th section); a vehicle speed controller configured to calculate a slope variation ($\Delta Slope\_{n+1,\ n}$) between the nth section and the (n+1) section and a slope variation ($\Delta Slope\_{n+2,\ n+1}$) between the (n+1)th section and the (n+2)th section using slope information regarding the three consecutive forward sections (nth section, (n+1)th section, and (n+2)th section) received from the road model transmission unit and to set control target vehicle speeds of the (n+1)th section and the (n+2)th section based on the calculated slope variations (($\Delta Slope\_{n+1,\ n}$) and ($\Delta Slope\_{n+2,\ n+1}$)); and a speed-following controller configured to receive a request for acceleration or deceleration and gear-shifting from the vehicle speed controller and reach and maintain the set control target vehicle speeds of the (n+1)th section and the (n+2)th section.

The vehicle speed controller may further be configured to calculate an acceleration/deceleration torque based on the set control target vehicle speeds of the (n+1)th section and the (n+2)th section and transmit an acceleration control request (EMS), an upshifting control request (TCU), a coasting operation control request (EMS/TCU), a downshifting control request (TCU), and a deceleration control request (ESC) to the speed-following controller.

In accordance with yet another aspect of the present disclosure, a vehicle may include a cruise control system, wherein the cruise control system may include: a road model transmission unit configured to analyze map information regarding a driving route and output a slope model of three consecutive forward sections; a vehicle speed controller configured to set a control target vehicle speed using slopes of the three consecutive forward sections and section distances received from the road model transmission unit; and a speed-following controller configured to receive a request for acceleration or deceleration and gear-shifting from the vehicle speed controller and reach and maintain the set control target vehicle speed.

In accordance with an aspect of the present disclosure, a method of controlling a cruise control system may include: outputting a slope model of three consecutive forward sections (nth section, (n+1)th section, and (n+2)th section) by calculating a linearly simplified road model using map information regarding a driving route; calculating a slope variation ($\Delta Slope\_{n+1,\ n}$) between the nth section and the (n+1) section and a slope variation ($\Delta Slope\_{n+2,\ n+1}$) between the (n+1)th section and the (n+2)th section using slope information of the three consecutive forward sections (nth section, (n+1)th section, and (n+2)th section) setting control target vehicle speeds of the (n+1)th section and the (n+2)th section based on the calculated slope variations (($\Delta Slope\_{n+1,\ n}$) and ($\Delta Slope\_{n+2,\ n+1}$)); requesting for acceleration or deceleration and gear-shifting by calculating acceleration/deceleration torques based on the set control target vehicle speeds of the (n+1)th section and the (n+2)th section; and outputting the acceleration/deceleration torques and gear levels in response to receiving the request for acceleration or deceleration and gear-shifting.

The setting of the control target vehicle speed of the (n+1)th section may be performed by increasing the control target vehicle speed of the (n+1)th section by setting the control target vehicle speed of the (n+1)th section to be greater than a target vehicle speed of the nth section when the calculated slope variation ($\Delta Slope\_{n+1,\ n}$) is less than an allowable lower limit. Additionally, the setting of the control target vehicle speed of the (n+1)th section may be performed by decreasing the control target vehicle speed of the (n+1)th section by setting the control target vehicle speed of the (n+1)th section to be less than a target vehicle speed of the nth section when the calculated slope variation ($\Delta Slope\_{n+1,\ n}$) is greater than an allowable upper limit.

The setting of the control target vehicle speed of the (n+1)th section may be performed by decreasing the control target vehicle speed of the (n+1)th section by setting the control target vehicle speed of the (n+1)th section to be less than a target vehicle speed of the nth section when the calculated slope variation ($\Delta Slope\_{n+1,\ n}$) is greater than an allowable upper limit. Further, the setting of the control target vehicle speed of the (n+1)th section may be performed by maintaining the control target vehicle speed of the (n+1)th section to be the same as a target vehicle speed of the nth section when the calculated slope variation ($\Delta Slope\_{n+1,\ n}$) is greater than an allowable lower limit and less than an allowable upper limit.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 4 is a table illustrating road shapes defined as three types by a cruise control system according to an exemplary embodiment of the present disclosure;

FIG. 5 is a table illustrating a slope profile of actual roads expressed as slope types defined in FIG. 4 according to an exemplary embodiment of the present disclosure;

FIG. 6 is a table illustrating a slope profile from which overlap types of FIG. 5 are removed according to an exemplary embodiment of the present disclosure;

DETAILED DESCRIPTION

Figure 1:
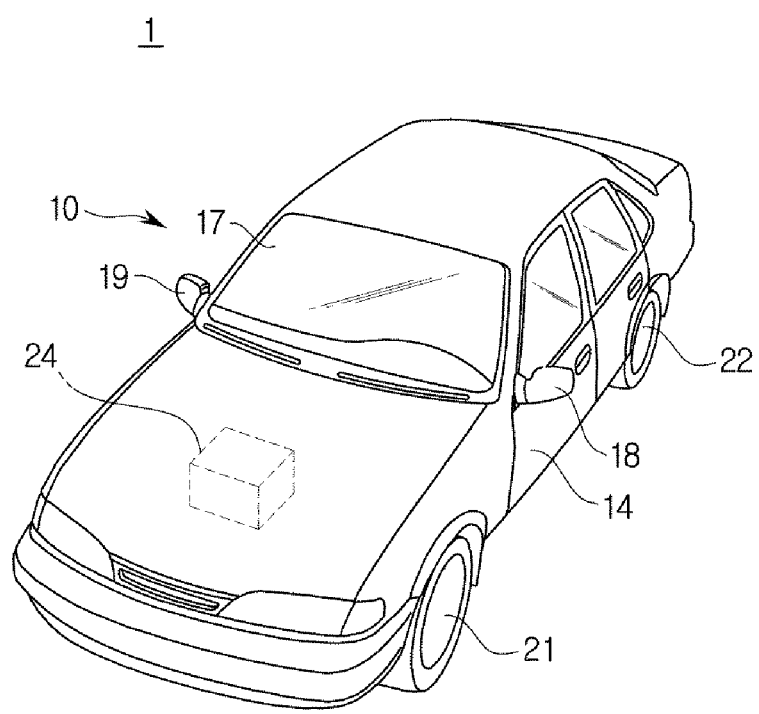
FIG. 1 is an external view of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings, wherein like reference numerals refer to like elements throughout.

Hereinafter, a cruise control system, a vehicle including the same, and a method of controlling the cruise control system according to exemplary embodiments of the present disclosure will be described in detail with reference to the drawings. FIG. 1 is an external view of a vehicle according to an exemplary embodiment.

Referring to FIG. 1, a vehicle 1 according to an exemplary embodiment may include a main body 10 that defines an appearance of the vehicle 1, wheels 21 and 22 configured to move the vehicle 1, a driving apparatus 24 configured to rotate the wheels 21 and 22, doors 14 configured to shield the interior of the vehicle 1 from the outside, a front glass 17 configured to provide a forward view to a driver within the vehicle 1, and side mirrors 18 and 19 configured to provide side and rear views of the vehicle to the driver.

The wheels 21 and 22 include front wheels 21 disposed at front portions of the vehicle 1 and rear wheels 22 disposed at rear portions of the vehicle 1. The driving apparatus 24 provides a turning force to the front wheels 21 or the rear wheels 22 to move the main body 10 forward or backward. The driving apparatus 24 may include an engine configured to generate a turning force by burning a fossil fuel or a motor to generate a turning force in response to receiving power from a battery (not shown). The doors 14 are pivotally coupled to the main body 10 at left and right sides of the main body 10 and opened for entering and exiting the vehicle 1 and closed for shielding the interior of the vehicle 1 from the outside.

The front glass 17 is disposed on the top front side of the main body 10 to allow the driver within the vehicle 1 to acquire visual information regarding views in front of the vehicle 1 and is also called a windshield glass. In addition, the side mirrors 18 and 19 include a left-side mirror 18 disposed at the left side of the main body 1 and a right-side mirror 19 disposed at the right side of the main body 1 providing the driver with visual information regarding side views and rear views of the vehicle 1.

The vehicle 1 may further include a sensing apparatus such as a proximity sensor configured to detect obstacles or other vehicles behind the vehicle 1 and a rain sensor configured to sense precipitation. For example, the proximity sensor may be configured to output a sensing signal in lateral and backward directions and receive a reflected signal from an obstacle such as another vehicle. Additionally, the proximity sensor may be configured to sense the existence of the obstacle behind the vehicle 1 based on a waveform of the received reflected signal and detect a position of the obstacle. The proximity sensor may employ a method of detecting a distance from the obstacle by outputting ultrasound and receiving reflected ultrasound from the obstacle. In addition, the vehicle 1 according to an exemplary embodiment may be electric vehicles (EVs), hybrid electric vehicles (HEVs), or fuel cell electric vehicles (FCEVs).

Figure 2:
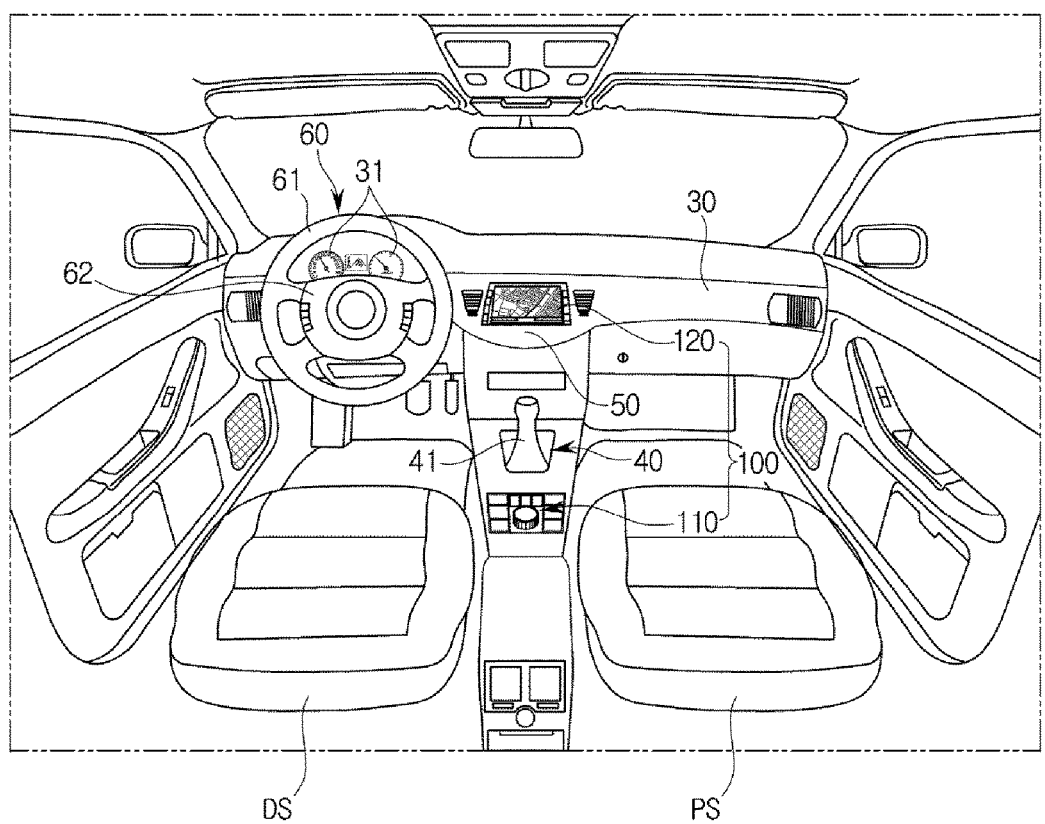
FIG. 2 is an interior view of the vehicle according to an exemplary embodiment of the present disclosure.

FIG. 2 is an interior view of the vehicle. Referring to FIG. 2, the interior of the vehicle 1 may include seats DS and PS on which the driver and a passenger may be seated, a dashboard 30 on which various instruments are disposed to execute vehicle operations and display driving information of the vehicle 1, and a steering wheel 60 configured to adjust a direction of the vehicle 1.

The seats DS and PS may include a driver's seat DS, a front passenger's seat PS, and back seats (not shown). The dashboard 30 may include an instrument cluster configured to display driving-related information in which a speedometer, a fuel gauge, an automatic transmission shift indicator light, a tachometer, a trip meter, and the like, are installed, a gear box 40, and a center fascia 50. The gear box 40 includes a transmission lever 41 used to shift a gear of the vehicle 1. An input unit 110 may also be installed on the dashboard or a similar location within the vehicle to receive use input instructions to execute main functions of an audio video navigation (AVN) device 100 or the vehicle 1. The center fascia 50 may include various devices such as an air conditioner, a clock, and the AVN device 100. The air conditioner maintains the inside of the vehicle 1 at a desired temperature by adjusting temperature, humidity, cleanness of air, and air flow inside the vehicle 1. The air conditioner may include at least one discharge port installed in the center fascia 50 and configured to discharge air. The center fascia 50 may include a button or dial to control the air conditioner, and the like. The user such as the driver may operate the air conditioner using the button or dial disposed at the center fascia 50.

The AVN device 100 mounted within the vehicle 1 is a system in which audio, video, and navigation functions are integrated for providing a radio tuning service for the driver to tune in and listen to a radio channel serviced from one of terrestrial radio stations, an audio services for playing compact disks (CDs), a video service for playing digital versatile disks (DVDs), a navigation service for providing a route guidance toward a destination, and a phone service for controlling whether to receive incoming calls of a mobile terminal connected to the vehicle 1. In addition, the AVN device 100 may also provide voice recognition for receiving voice commands other than the user's manipulation to provide the radio, audio, video, navigation, and phone services.

The AVN device 100 may be installed on the dashboard 30 as a mounted-type or may be embedded in the center fascia 50. In particular, only a touch screen 120 of the AVN device 100 may be exposed to the outside. The user may obtain radio, audio, video, and navigation services via the AVN device 100. The AVN device 100 may also be referred to as a navigation terminal, a display device, or any other various terms obvious to those skilled in the art. Additionally, the AVN device 100 may include a universal serial bus (USB) port to be connected to a communications terminal such as a smartphone, a portable multimedia player (PMP), a MPEG audio layer-3 (MP3) player, and a personal digital assistant (PDA) to reproduce audio and video files.

The steering wheel 60 may include a rim 61 gripped by the driver and a spoke 62 connected to a steering apparatus of the vehicle 1 and connecting the rim 61 with a hub of a rotating shaft for steering. According to an exemplary embodiment, the spoke 62 may include manipulators to operate various devices of the vehicle 1, e.g., the AVN device 100. The AVN device 100 may be configured to selectively display at least one of an audio screen, a video screen, a navigation screen, and a phone screen via the touch screen 120, as well as various control screens to operate the vehicle 1 or screens related to additional functions performed by the AVN device 100.

According to an exemplary embodiment, the AVN device 100 may be configured to display various control screens related to the operation of the air conditioner via the touch screen 120 by interworking with the air conditioner. In addition, the AVN device 100 may be configured to adjust air conditioning environments in the vehicle 1 by adjusting the operation state of the air conditioner. The AVN device 100 may also be configured to display a map with a route toward the destination via the touch screen 120 to the driver.

The touch screen 120 may be implemented with a liquid crystal display (LCD) panel, a light emitting diode (LED) panel, an organic light emitting diode (OLED) panel, or the like to display screens or input instructions or commands. The touch screen 120 may be configured to output a screen having an image or receive an input of an instruction or command based on an operating system (OS) to drive and operate the AVN device 100 or an application in execution in the AVN device 100. The touch screen 120 may also be configured to display a basic screen based on the application in execution. The basic screen refers to a screen displayed by the touch screen 120 when a touch is not applied thereto (e.g., a home screen). The touch screen 120 may be configured to display a touch manipulation screen based on circumstances or received touch signals. The touch manipulation screen refers to a screen that detects a user touch manipulation as input.

Further, the touch screen 120 may be implemented using a resistive touch screen configured to sense a touch of the user by using pressure on a panel, a capacitive touch screen that senses a touch of the user by using a capacitive coupling effect, an optical touch screen using infrared light, or an ultrasound touch screen using ultrasound. However, any other various methods may also be applied thereto, without being limited thereto. The touch screen 120 is a device aiding interaction between the AVN device 100 of the vehicle 1 and the user to receive a user's command via touch interactions and by selecting text and menu displayed on the touch screen 120.

Figure 3:
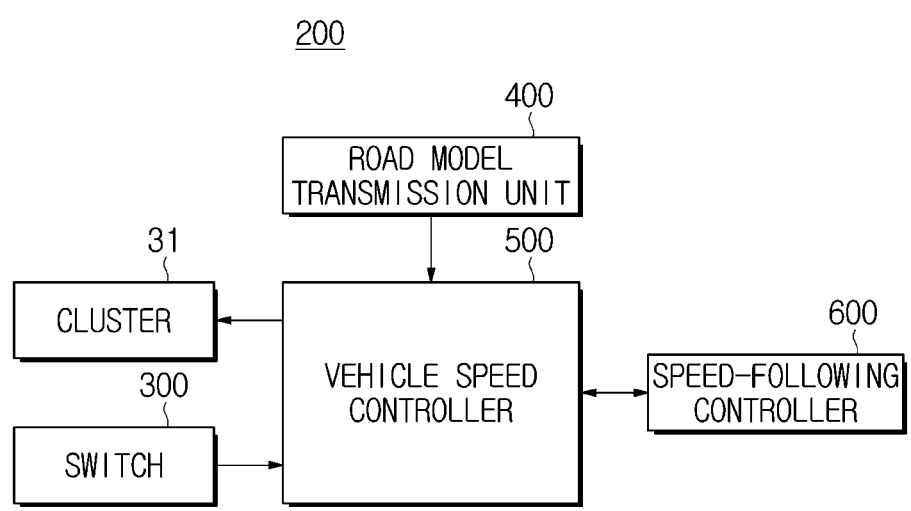
FIG. 3 is a control block diagram of a cruise control system interworking with a navigation device according to an exemplary embodiment of the present disclosure.

FIG. 3 is a control block diagram of a cruise control system interworking with a navigation device according to an exemplary embodiment. Referring to FIG. 3, a cruise control system 200 interworking with a navigation device according to an exemplary embodiment may include a cluster 31, a switch 300, a road model transmission unit 400, a vehicle speed controller 500, and a speed-following controller 600.

The cluster 31 is an instrument panel mounted within the vehicle 1 and configured to display driving-related information of the vehicle 1. The cluster 31 may include a speedometer having an odometer and a trip meter, a revolutions per minute (RPM) meter that indicates RPM of an engine, a fuel gauge that indicates a level of fuel remaining in a tank, and a coolant temperature indicator that indicates temperature of a coolant. The switch 300 may be a cruise control switch (constant speed driving switch) configured to turn on or off operation of the cruise control system for the driver to set a desired vehicle speed to a constant speed driving speed. The road model transmission unit 400 may be a navigation device configured to calculate a linearly simplified road model from map information of a driving route and output road model information. The road model transmission unit 400 may be configured to generate and output a slope model of three consecutive forward sections by analyzing information regarding routes ahead and altitudes (e.g., inclinations) thereof.

Information regarding slope, curvature, and vehicle speed required to predict a driving situation (driving resistance) may be obtained based on information regarding topographical elements (Geometry: X, Y, and Z coordinates) of the driving route on an advanced driver assistance systems (ADAS) map in a system associated with map information. As the driving resistance, air resistance and acceleration (inertia) resistance are variable parameters determined by the driver (vehicle speed), rolling resistance is a fixed parameter determined by intrinsic properties of the vehicle 1, and slope resistance is a fixed parameter predetermined by the driving route. In particular, the slope and vehicle speed are factors having a substantial influence on the driving resistance. Since slope resistance caused by the slope is about three times greater than air resistance caused by the vehicle speed, vehicle speed information is synchronized based on slope sections.

Further, a map information linear simplification road model may be defined using section distance of each of three consecutive forward sections (n, n+1, and n+2)/average valid slope/average valid vehicle speed based on a method developed by the present inventors and disclosed in Korean Patent Application No. 10-2015-0146532. This will be described with reference to FIGS. 4 to 6. FIG. 4 is a table illustrating road shapes defined as three types by a cruise control system according to an exemplary embodiment. FIG. 5 is a table illustrating a slope profile of actual roads expressed as slope types defined in FIG. 4. FIG. 6 is a table illustrating a slope profile from which overlap types of FIG. 5 are removed.

As illustrated in FIG. 4, slope types of roads may be broadly classified into downhill roads, flatlands, and uphill roads. The slope profile of actual roads may be represented as 27(3^3) types that are combinations of three consecutive slope types as illustrated in FIG. 5. When overlap types are removed from the total of 27 slope roads, a total number of slope profiles of the actual roads may be expressed as 21 types as illustrated in FIG. 6. In conclusion, a driving situation may be estimated using only information regarding three consecutive forward sections. After information regarding a slope model of three consecutive forward sections is output, the information may be updated at every next section (e.g., information regarding three consecutive forward sections may be received continuously in real time). This linear simplification road modeling and transmitting method is applied to the present disclosure.

Referring to FIG. 3, the vehicle speed controller 500 may be configured to set a control target vehicle speed using respective slopes of the three consecutive forward sections/section distance received from the road model transmission unit 400 and transmit a request signal for adjusting acceleration or deceleration and gear-shifting. A method of setting a control target vehicle speed ($\Delta V\_neg/pos$) using respective slopes of the three consecutive forward sections/section distance and requesting acceleration or deceleration and gear-shifting by the vehicle controller will be described in more detail below with reference to FIGS. 7 to 10.

The speed-following controller 600 is a vehicle controller (e.g., engine management system (EMS), electronic stability control (ESC), or transmission control unit (TCU)) configured to receive a request for acceleration or deceleration and gear-shifting from the vehicle speed controller 500 and output an acceleration torque or a deceleration torque and a gear level. Additionally, the speed-following controller 600 according to an exemplary embodiment may be implemented by mounting the vehicle speed controller 500 on the vehicle controller (EMS, ESC, or TCU) in accordance with configuration of a control system. The controllers may also be integrated into a single controller.

Figure 7:
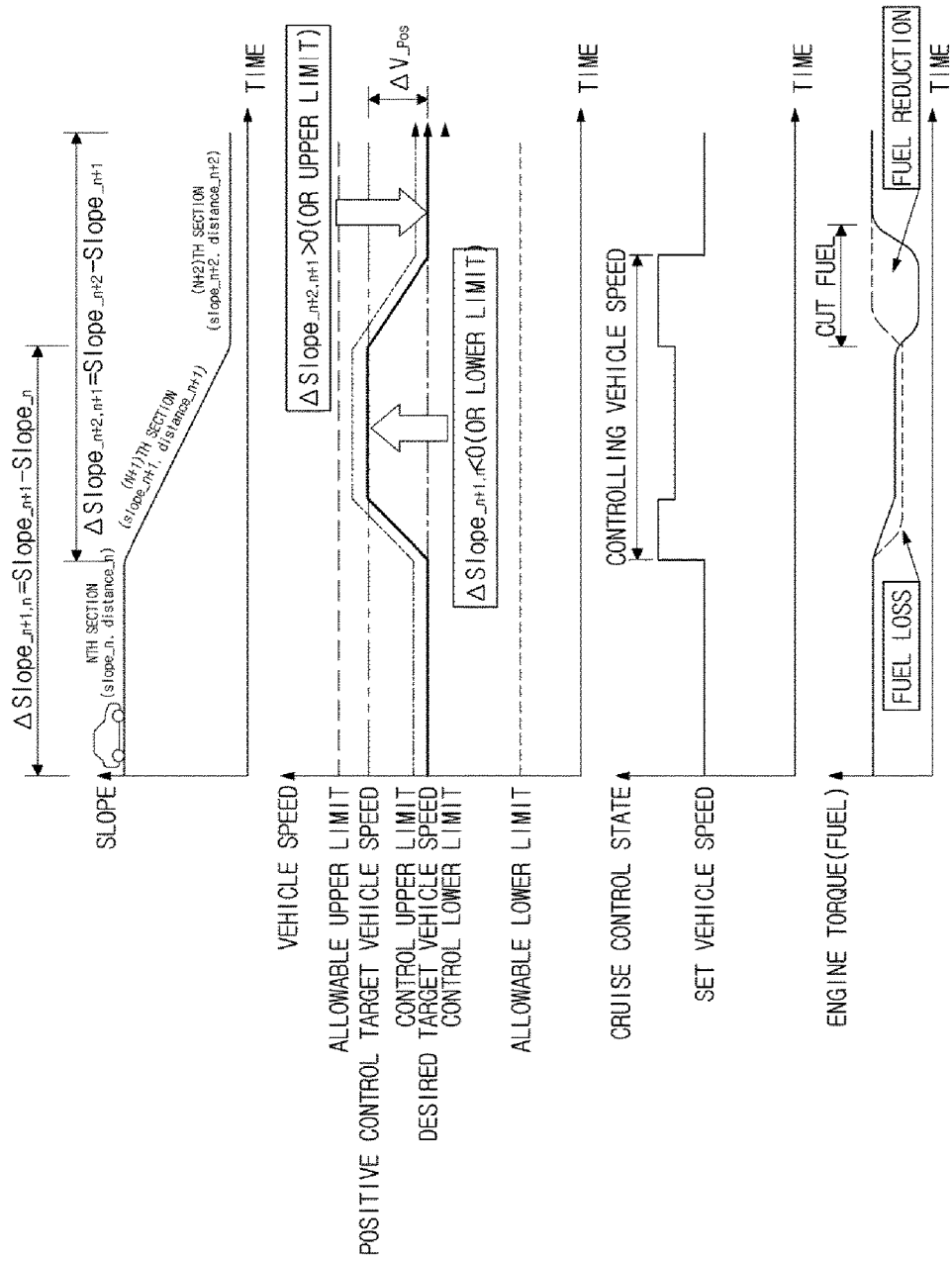
FIG. 7 is a diagram illustrating a method of setting a positive control target vehicle speed for a downhill road slope while a cruise control system according to an exemplary embodiment of the present disclosure operates.
Figure 8:
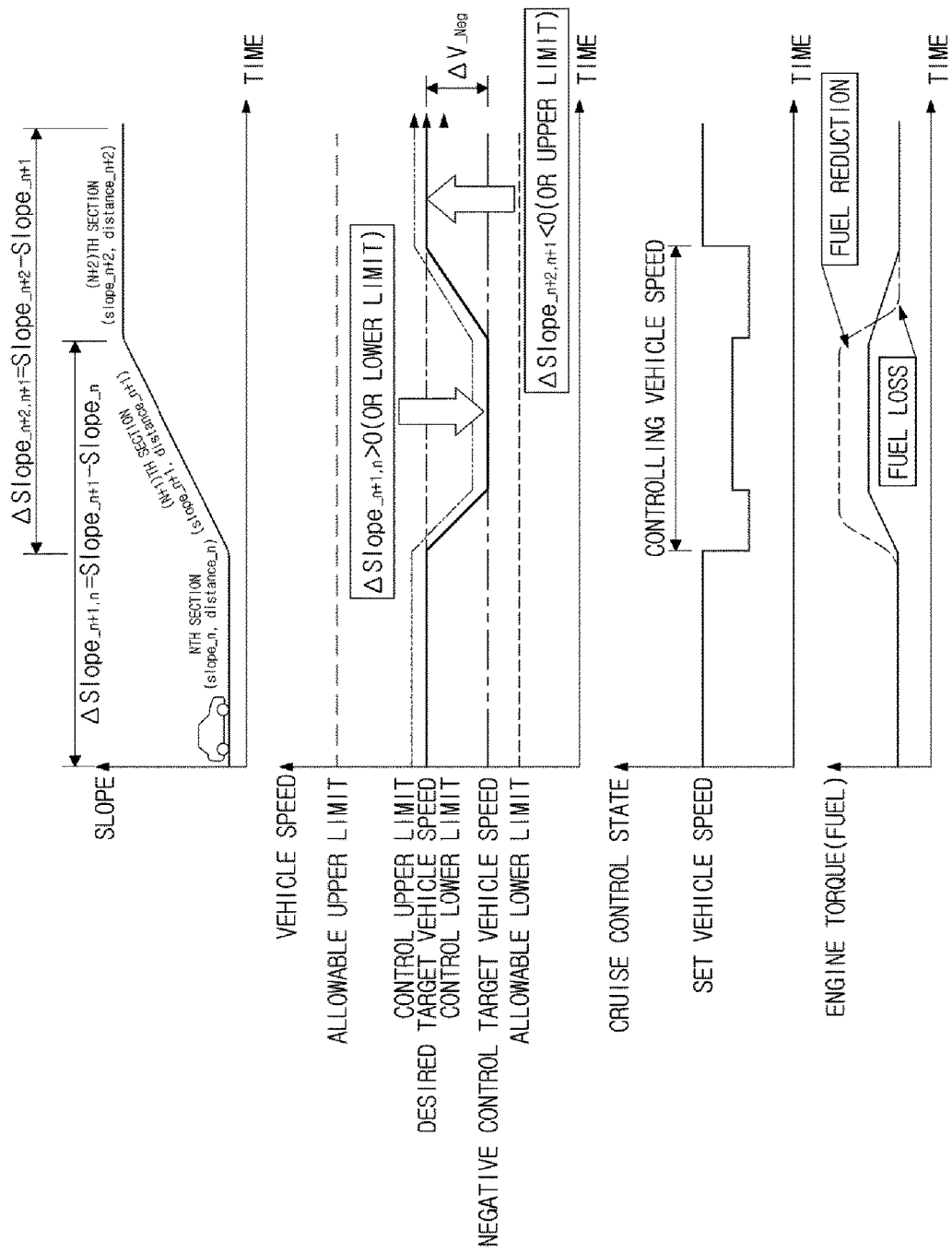
FIG. 8 is a diagram illustrating a method of setting a negative control target vehicle speed for an uphill road slope while the cruise control system according to an exemplary embodiment of the present disclosure operates.

Hereinafter, operation processes and effects of the cruise control system, the vehicle including the same, and the method of controlling the cruise control system according to an exemplary embodiment will be described. FIG. 7 is a diagram illustrating a method of setting a positive control target vehicle speed for a downhill road slope while a cruise control system according to an exemplary embodiment operates. FIG. 8 is a diagram illustrating a method of setting a negative control target vehicle speed for an uphill road slope while the cruise control system according to an exemplary embodiment operates.

Referring to FIGS. 7 and 8, the vehicle speed controller 500 may be configured to set a control target vehicle speed ($\Delta V\_neg/pos$) of an (n+1)th section based on a slope variation ($\Delta Slope\_{n+1, n}$) between an nth section and the (n+1)th section and set a control target vehicle speed ($\Delta V\_neg/pos$) of an (n+2)th section based on a slope variation ($\Delta Slope\_{n+2, n+1}$) between the (n+1)th section and the (n+2)th section using information regarding three consecutive forward sections (n, n+1, and n+2) received from the road model transmission unit 400.

When a slope variation between two consecutive sections is positive (+), a control target vehicle speed of a subsequent section may be set to be less than a control target vehicle speed (or set target vehicle speed) of a previous section to reduce fuel consumption in the section having lower energy efficiency (by reducing required driving resistance). When a slope variation between two consecutive sections is negative (−), a control target vehicle speed of a subsequent section is set to be greater than a control target vehicle speed (or set target vehicle speed) of a previous section to increase kinetic energy of the vehicle 1 in the section having greater energy efficiency. Thus, fuel efficiency may be considerably increased in almost all sections by reducing unnecessary reacceleration and braking in comparison with conventional vehicles.

Figure 9:
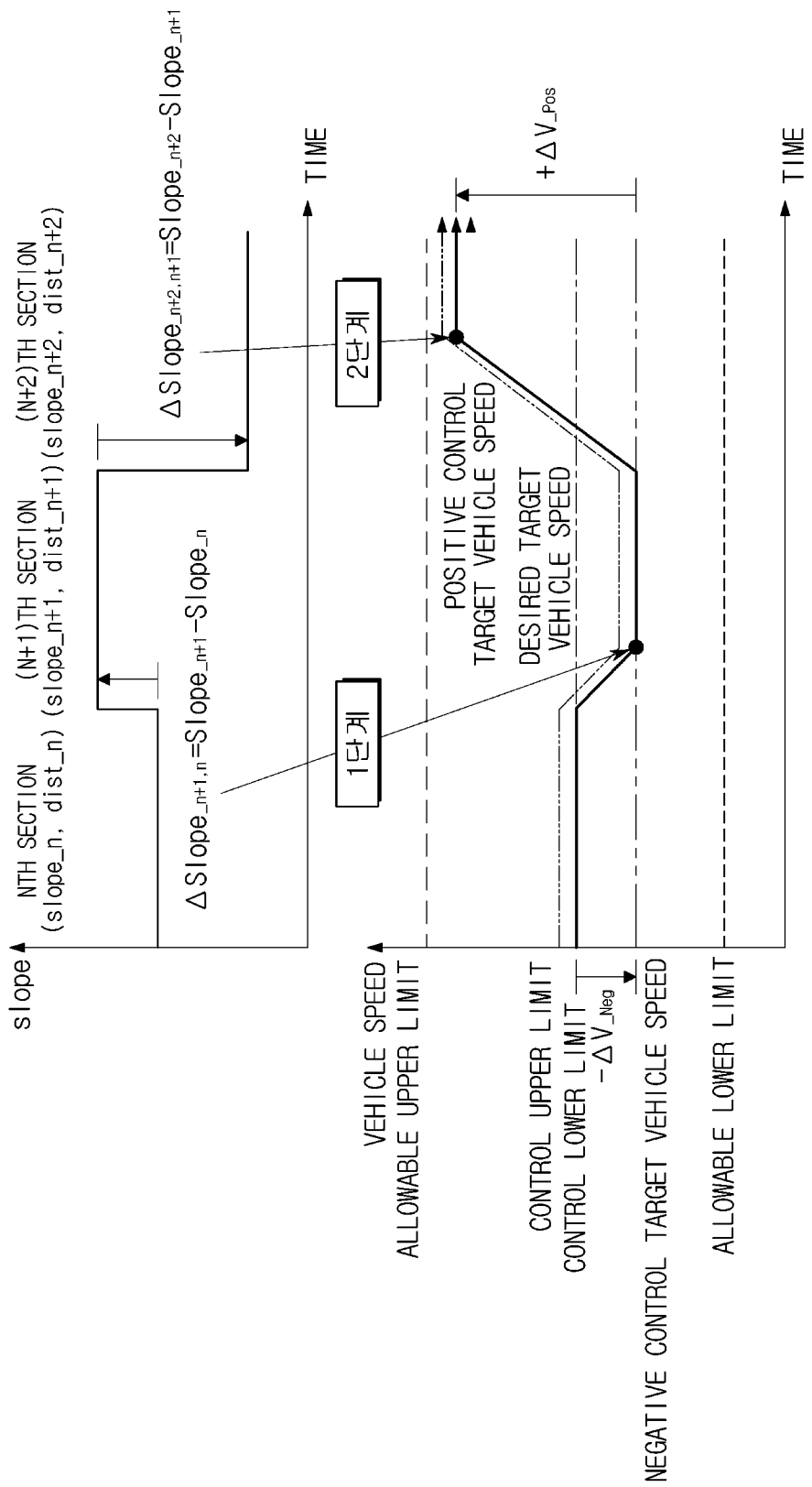
FIG. 9 is a diagram illustrating a method of setting a control target vehicle speed (ΔV_neg/pos) using a slope variation of three consecutive forward sections while a cruise control system according to an exemplary embodiment of the present disclosure operates.

FIG. 9 is a diagram illustrating a method of setting a control target vehicle speed ($\Delta V\_neg/pos$) using a slope variation of three consecutive forward sections while a cruise control system according to an exemplary embodiment operates. Referring to FIG. 9, a control target vehicle speed of the (n+1)th section may be set in a first stage. The control target vehicle speed ($\Delta V\_neg$) of the (n+1)th section may be determined based on a slope variation ($\Delta Slope\_{n+1, n}=\Delta Slope\_n+1-\Delta Slope\_n$) between the nth section and the (n+1)th section. In a second stage, a control target vehicle speed of the (n+2)th section may be set. The control target vehicle speed ($\Delta V\_pos$) of the (n+2)th section may be determined based on a slope variation ($\Delta Slope\_{n+2, n+1}=\Delta Slope\_n+2-\Delta Slope\_n+1$) between the (n+1)th section and the (n+2)th section.

Figure 10:
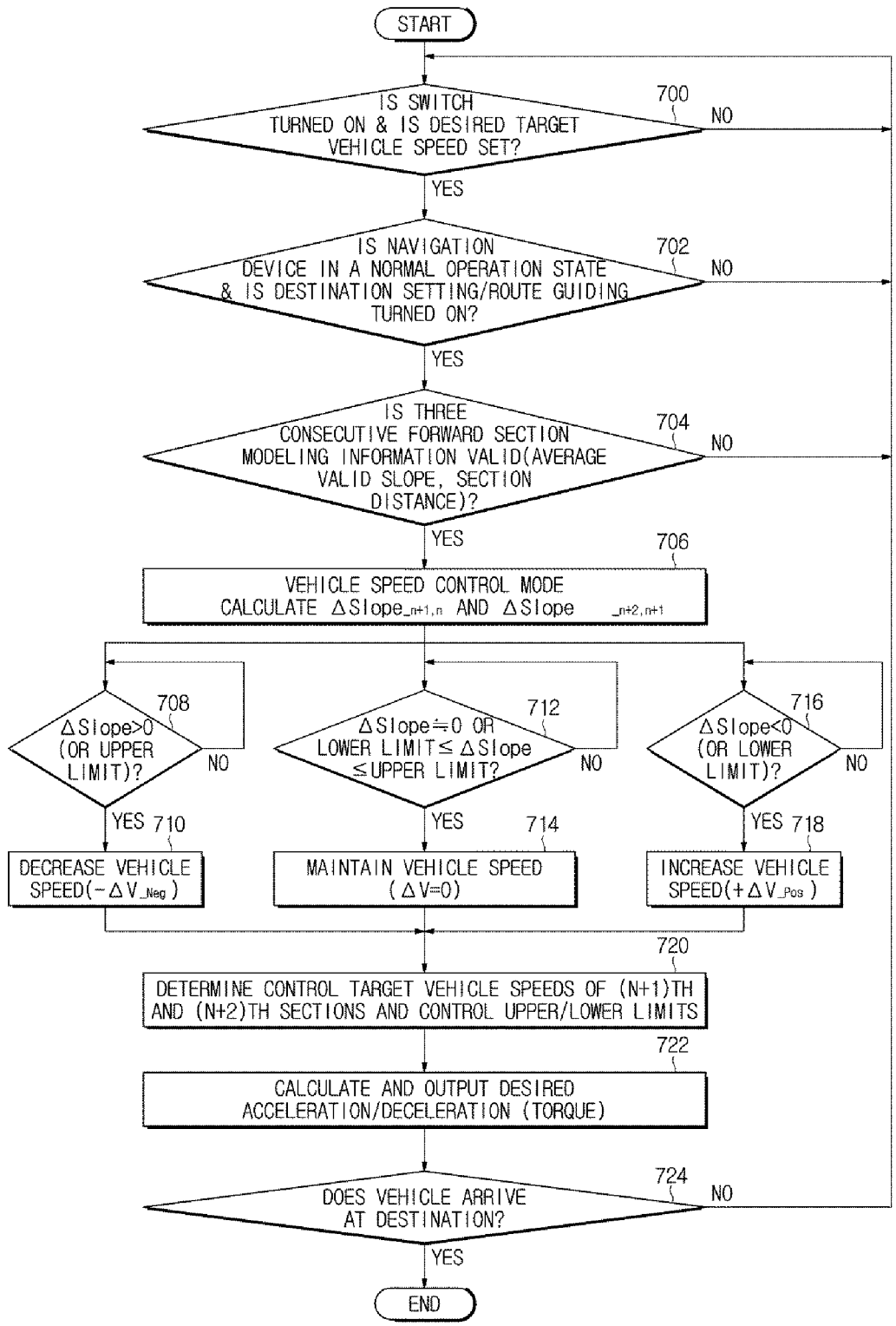
FIG. 10 is a flowchart illustrating a method of setting a control target vehicle speed (ΔV_neg/pos) using the slope variations of three consecutive forward sections of FIG. 9 according to an exemplary embodiment of the present disclosure.

FIG. 10 is a flowchart of a method of setting a control target vehicle speed ($\Delta V\_neg/pos$) using the slope variations of three consecutive forward sections of FIG. 9. Referring to FIG. 10, the vehicle speed controller 500 may be configured to determine whether the switch 300 is turned on and the vehicle speed controller 500 may be configured to receive a target vehicle speed from a user or driver input (700).

In response to determining that the switch 300 is turned on and the desired target vehicle speed is received based on the result of operation 700, the vehicle speed controller 500 may be configured to determine whether the navigation device is in a normal operation state and destination setting/route guiding is turned on (702). In response to determining that the navigation device is in the normal operation state (e.g., no failure, malfunction, or error) and the destination setting/route guiding is turned on based on the result of operation 702, the vehicle speed controller 500 may be configured to receive information regarding three consecutive forward sections from the road model transmission unit 400 and determine whether three section road modeling information (e.g., average valid slope and section distance) are valid (704).

When required, although the navigation device is in the normal operation state and the destination setting/route guiding is turned off based on the result of operation 702, the vehicle speed controller 500 may be configured to receive information regarding three consecutive forward sections from the road model transmission unit 400 and determine whether the three-section road modeling information (e.g., average valid slope and section distance) are valid in a most possible path (MPP) state (704). The most possible path (MPP) state defines the specification for finding a link in a forward direction that is highly likely to advance forward without a path search. In addition, the most possible path (MPP) state defines the specification for transmitting forward link information at the forward intersection or fork at the current location.

In response to determining that the road modeling information is valid based on the result of operation 704, the vehicle speed controller 500 may be configured to enter a vehicle speed control mode (706).

In the vehicle speed control mode, the slope variation ($\Delta Slope\_{n+1, n}$) between the nth section and the (n+1)th section and the slope variation ($\Delta Slope\_{n+2, n+1}$) between the (n+1)th section and the (n+2)th section may be calculated. Thus, the vehicle speed controller 500 may be configured to determine whether the calculated slope variation ($\Delta Slope$) is greater than 0 (or (+) allowable upper limit) (708). In response to determining that the calculated slope variation ($\Delta Slope$) is greater than 0 (or (+) allowable upper limit) based on the result of operation 708, the vehicle speed controller 500 may be configured to decrease a control target vehicle speed ($-\Delta V\_{Neg}$) by setting the target vehicle speed to be less than that of a previous section (deceleration control $V\_{Control\ Target\ n+1(n+2)} = V\_{Control\ Target\ n(n+1)} - \Delta V\_{Negative\ Term}$) (710).

Further, the vehicle speed controller 500 may be configured to determine whether the slope variation ($\Delta Slope$) is 0 (or (−) allowable lower limit≤$\Delta Slope$≤(+) allowable upper limit) (712). In response to determining that the slope variation ($\Delta Slope$) is 0 (or (−) allowable lower limit≤$\Delta Slope$≤(+) allowable upper limit) based on the result of operation 712, the vehicle speed controller 500 may be configured to set the target vehicle speed to be the same as that of the previous section to maintain the control target vehicle speed ($\Delta V = 0$) ($V\_{Control\ Target\ n+1(n+2)} = V\_{Control\ Target\ n(n+1)}$) (714).

Additionally, the vehicle speed controller 500 may be configured to determine whether the slope variation ($\Delta Slope$) is less than 0 (or (−) allowable lower limit) (716). In response to determining that the slope variation ($\Delta Slope$) is less than 0 (or (−) allowable lower limit) based on the result of operation 716, the vehicle speed controller 500 may be configured to increase the control target vehicle speed ($+\Delta V\_{Pos}$) by setting the target vehicle speed to be greater than that of the previous section (acceleration control $V\_{Control\ Target\ n+1(n+2)} = V\_{Control\ Target\ n(n+1)} + \Delta V\_{Positive\ Term}$) (718).

As described above, the vehicle speed controller 500 may be configured to determine the upper and lower limits of the control target vehicle speeds of the (n+1)th section and the (n+2)th section (720). In addition, the vehicle speed controller 500 may be configured to calculate an acceleration torque and a deceleration torque and transmit an acceleration control request (EMS), an upshifting control request (TCU), a coasting operation control request (EMS/TCU), a downshifting control request (TCU), and a deceleration control request (ESC) to the speed-following controller 600.

Accordingly, in response to receiving the request for acceleration or deceleration and gear-shifting from the vehicle speed controller 500, the speed-following controller 600 may be configured to output the acceleration and/or deceleration torque and a gear level (722). The vehicle speed controller 500 may then be configured to determine whether the vehicle 1 reaches a destination using the cruise control system (724). When the vehicle 1 does not reach the destination, the process returns to operation 700 to perform next operations. In response to determining that the vehicle 1 reaches the destination based on the result of operation 724, the process may be terminated.

Figure 11:
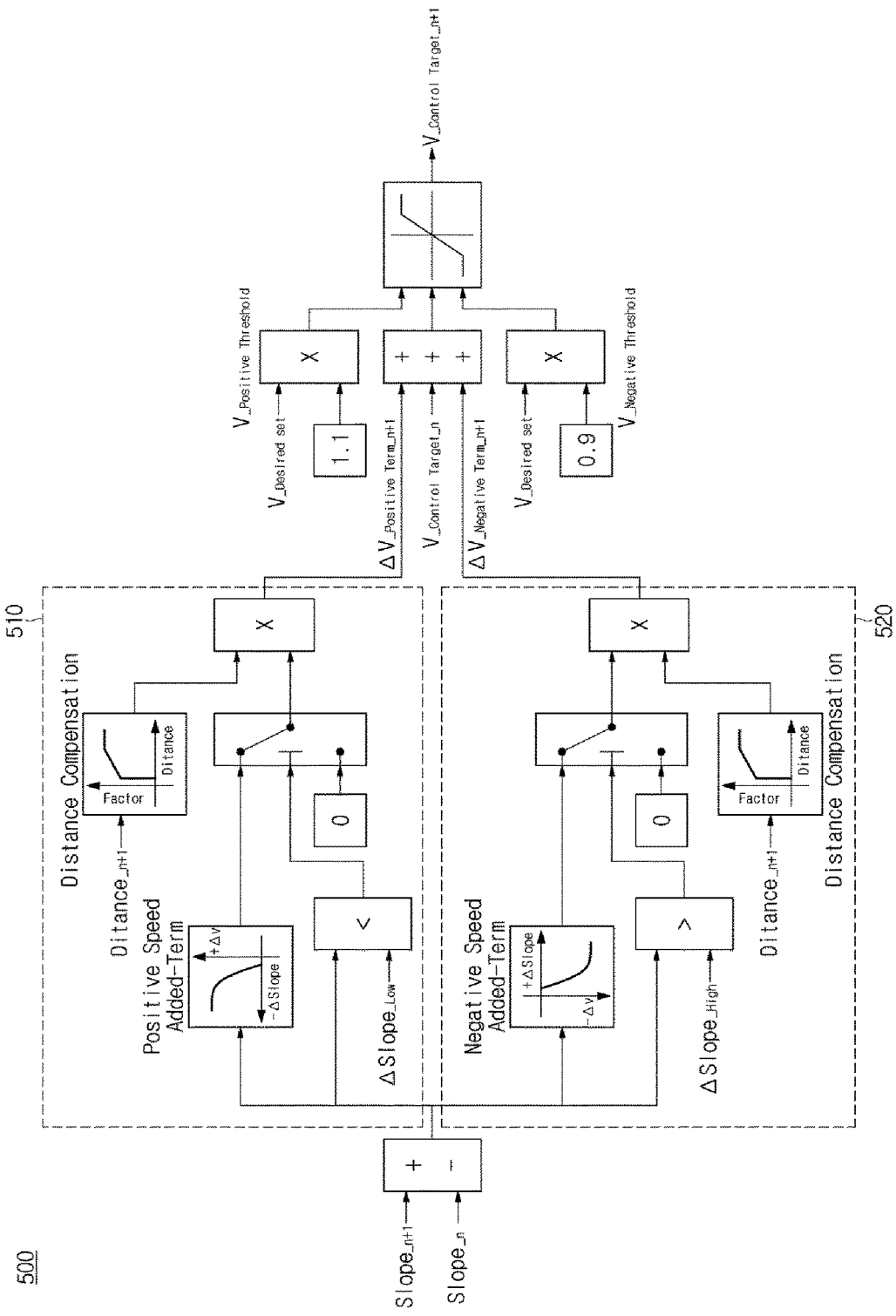
FIG. 11 is a diagram illustrating a method of logically determining a control target vehicle speed of the (n+1)th section while the cruise control system according to an exemplary embodiment of the present disclosure operates.

Moreover, the process of determining the control target vehicle speed of the (n+1)th section will be described with reference to FIG. 11. FIG. 11 is a diagram illustrating a method of logically determining a control target vehicle speed of the (n+1)th section while the cruise control system according to an exemplary embodiment operates.

Referring to FIG. 11, in response to receiving an input of information regarding slopes of the nth section and the (n+1)th section (Slope_$_{n+1}$, Slope_$_n$) is input, a first vehicle speed controller 510 may be configured to calculate a slope variation ($\Delta$Slope_$_{n+1, n}$) between the nth section and the (n+1)th section. When the slope variation ($\Delta$Slope_$_{n+1, n}$) between the nth section and the (n+1)th section is less than $\Delta$Slope_$_{Low}$, the first vehicle speed controller 510 may be configured to increase a Positive Speed Added_Term to increase the control target vehicle speed to be greater than that of the previous section.

In addition, when a negative (−) slope variation ($\Delta$Slope_$_{n+1, n}$) of the (n+1)th section is less than a predetermined value, the Positive Speed Added_Term may be uniformly compensated to prevent an excessive increase in the control target vehicle speed. When a section distance (Distance_$_{n+1}$) of the (n+1)th section is less than a predetermined value, variable control may be limited due to a negligible effect of the control (compensation factor→0). When the section distance (Distance_$_{n+1}$) of the (n+1)th section is greater than a predetermined value, variable control may be limited to prevent an excessive increase in the control target vehicle speed (compensation factor→1.1 (maximum 10%)).

In FIG. 11, when information regarding the slopes of the nth section and the (n+1)th section (Slope_$_{n+1}$, Slope_$_n$) is input (e.g., received by the controller), a second vehicle speed controller 520 may be configured to calculate a slope variation ($\Delta$Slope_$_{n+1, n}$) between the nth section and the (n+1) section. When the slope variation ($\Delta$Slope_$_{n+1, n}$) between the nth section and the (n+1)th section is greater than $\Delta$Slope_$_{High}$, the second vehicle speed controller 520 may be configured to increase a Negative Speed Added_Term to decrease the control target vehicle speed to be less than that of the previous section.

In addition, when a positive (+) slope variation ($\Delta$Slope_$_{n+1, n}$) of the (n+1)th section is greater than a predetermined value, the Negative Speed Added_Term may be uniformly compensated to prevent an excessive reduction in the control target vehicle speed. When the section distance (Distance_$_{n+1}$) of the (n+1)th section is less than a predetermined value, variable control may be limited due to a negligible effect of the control (compensation factor→0). When the section distance (Distance_$_{n+1}$) of the (n+1)th section is greater than a predetermined value, variable control may be limited to prevent an excessive reduction in the control target vehicle speed (compensation factor→0.9 (maximum −10%)).

Figure 12:
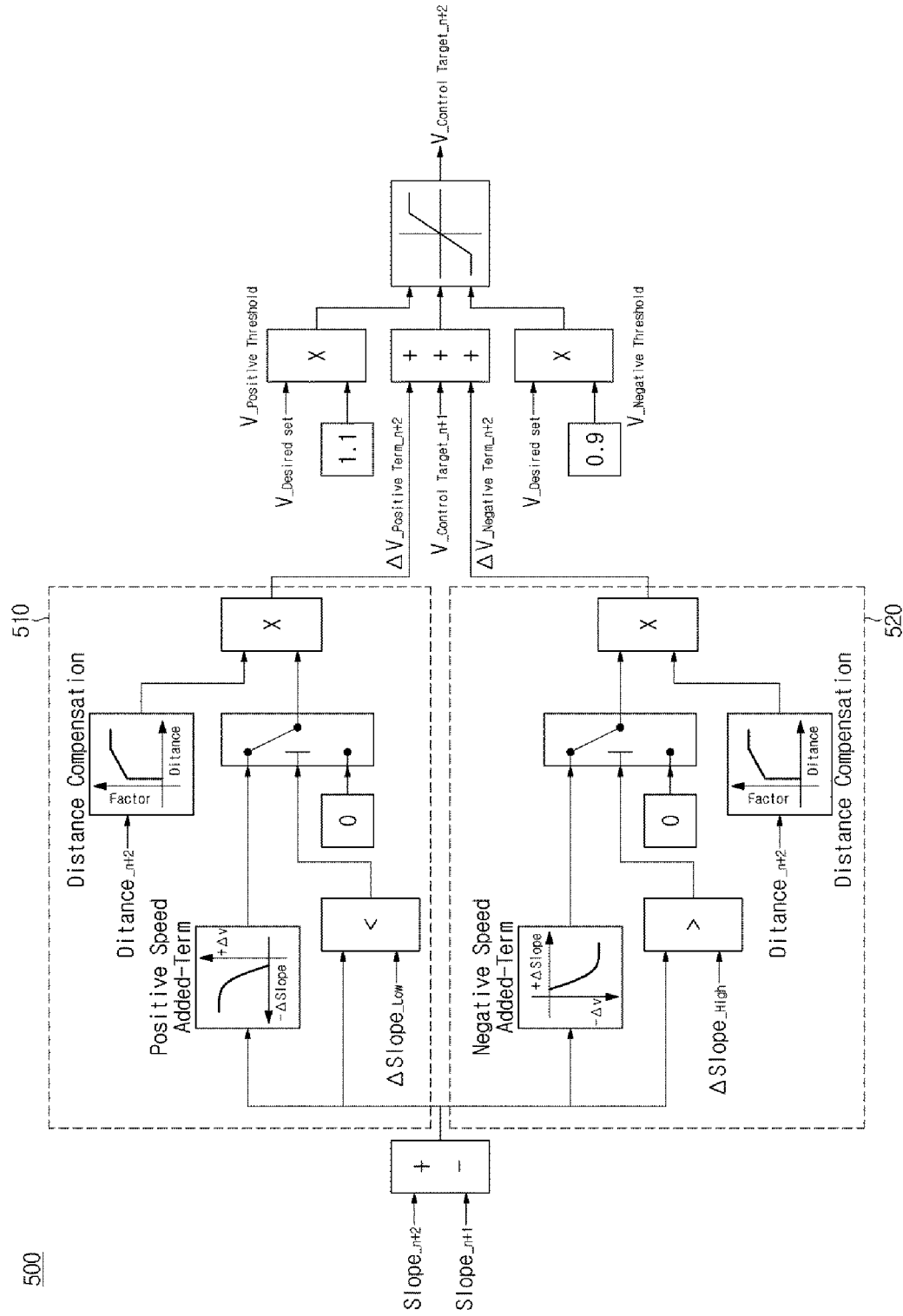
FIG. 12 is a diagram illustrating a method of logically determining a control target vehicle speed of the (n+2)th section while the cruise control system according to an exemplary embodiment of the present disclosure operates.

Furthermore, the process of determining the control target vehicle speed of the (n+2)th section will be described with reference to FIG. 12. FIG. 12 is a diagram illustrating a method of logically determining a control target vehicle speed of the (n+2)th section while the cruise control system according to an exemplary embodiment operates.

Referring to FIG. 12, in response to receiving an input of information regarding slopes of the (n+1)th section and the (n+2)th section (Slope_$_{n+2}$, Slope_$_{n+1}$), the first vehicle speed controller 510 may be configured to calculate a slope variation ($\Delta$Slope_$_{n+2, n+1}$) between the (n+1)th section and the (n+2)th section. When the slope variation ($\Delta$Slope_$_{n+2, n+1}$) between the (n+1)th section and the (n+2)th section is less than $\Delta$Slope_$_{Low}$, the first vehicle speed controller 510 may be configured to increase a Positive Speed Added_Term to increase a control target vehicle speed to be greater than that of a previous section.

In addition, when a negative (−) slope variation ($\Delta$Slope_$_{n+2, n+1}$) of the (n+2)th section is less than a predetermined value, the Positive Speed Added_Term may be uniformly compensated to prevent an excessive increase in the control target vehicle speed. When a section distance (Distance_$_{n+2}$) of the (n+2)th section is less than a predetermined value, variable control may be limited due to a negligible effect of the control (compensation factor→0). When the section distance (Distance_$_{n+2}$) of the (n+2)th section is greater than a predetermined value, variable control may be limited to prevent an excessive increase in the control target vehicle speed (compensation factor→1.1 (maximum 10%)).

In FIG. 12, when information regarding the slopes of the (n+1)th section and the (n+2)th section (Slope_$_{n+2}$, Slope_$_{n+1}$) is input (e.g., received by the controller), the second vehicle speed controller 520 may be configured to calculate a slope variation ($\Delta$Slope_$_{n+2, n+1}$) between the (n+1)th section and the (n+2)th section. When the slope variation ($\Delta$Slope_$_{n+2, n+1}$) between the (n+1)th section and the (n+2)th section is greater than $\Delta$Slope_$_{High}$, the second vehicle speed controller 520 may be configured to increase a Negative Speed Added_Term to decrease the control target vehicle speed to be less than that of the previous section.

In addition, when a positive (+) slope variation ($\Delta$Slope_$_{n+2, n+1}$) of the (n+2)th section is greater than a predetermined value, the Negative Speed Added_Term may be uniformly compensated to prevent an excessive reduction in the control target vehicle speed. When the section distance (Distance_$_{n+2}$) of the (n+2)th section is less than a predetermined value, variable control may be limited due to a negligible effect of the control (compensation factor→0). When the section distance (Distance_$_{n+2}$) of the (n+2)th section is greater than a predetermined value, variable control is limited to prevent an excessive reduction in the control target vehicle speed (compensation factor→0.9 (maximum −10%)).

Figure 13:
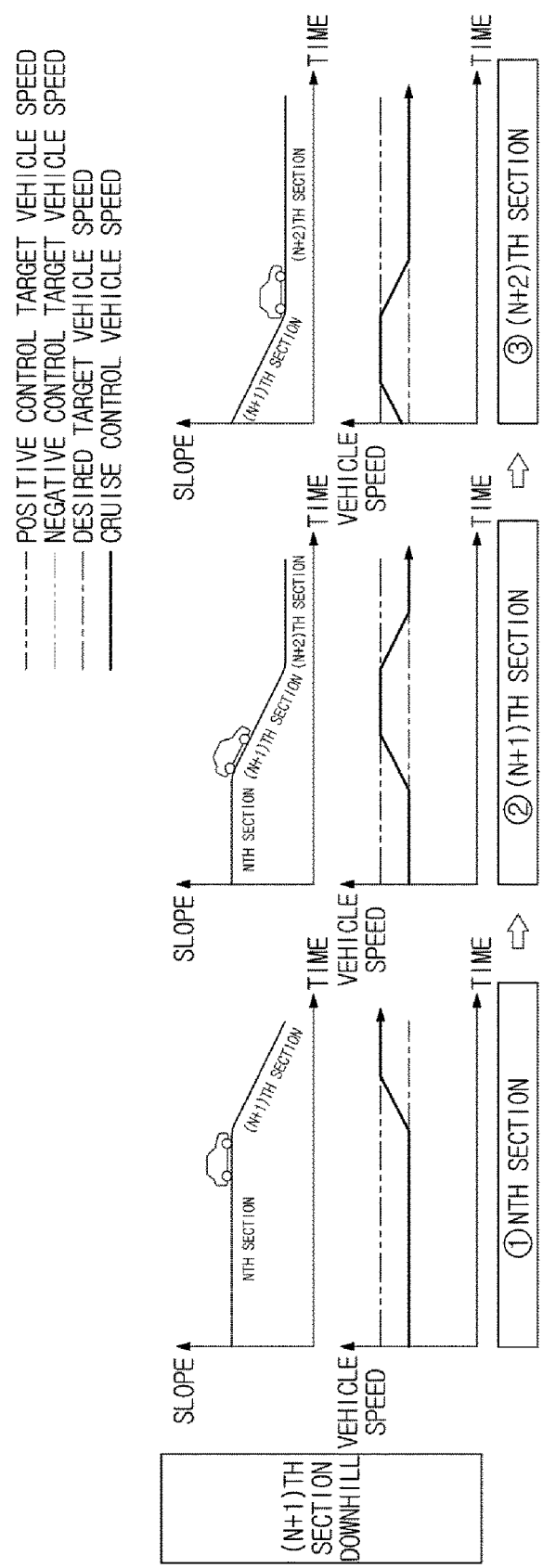
FIG. 13 is a diagram illustrating control target vehicle speeds of the cruise control system in three sections when the (n+1)th section is a downhill road according to an exemplary embodiment of the present disclosure.

Next, various control target vehicle speeds while the cruise control system according to an exemplary embodiment operates will be exemplarily described with reference to FIGS. 13 to 20. FIG. 13 is a diagram illustrating control target vehicle speeds of the cruise control system in three sections when the (n+1)th section is a downhill road. Referring to FIG. 13, when the (n+1)th section is a downhill road, the control target vehicle may be is increased by setting the target vehicle speed to be greater than that of the previous section.

Figure 14:
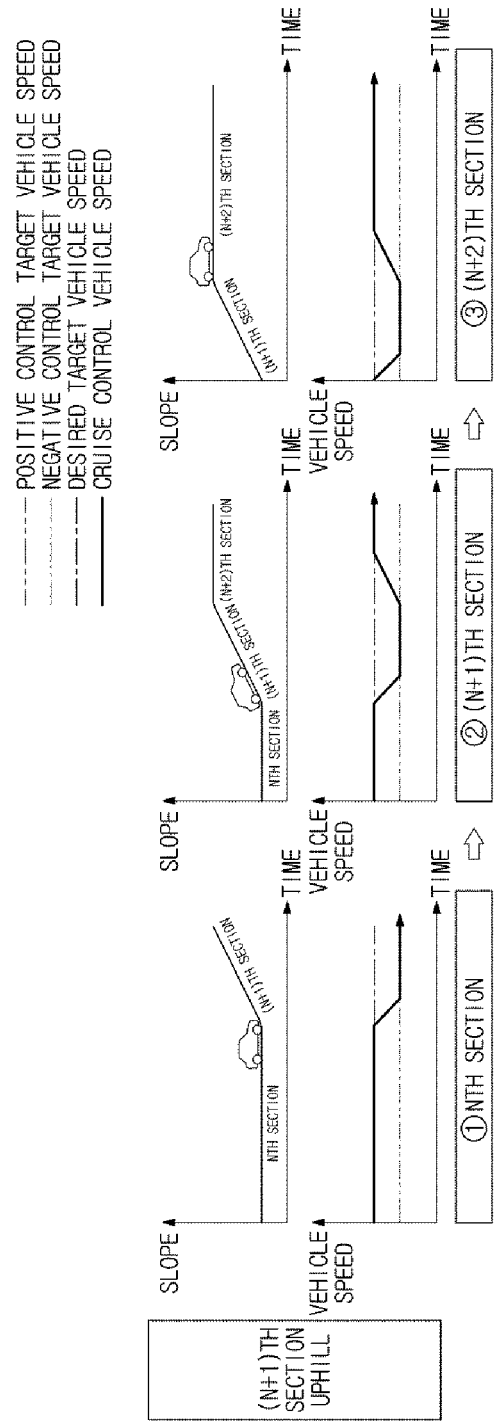
FIG. 14 is a diagram illustrating control target vehicle speeds of the cruise control system in three sections when the (n+1)th section is an uphill road according to an exemplary embodiment of the present disclosure.

FIG. 14 is a diagram illustrating control target vehicle speeds of the cruise control system in three sections when the (n+1)th section is an uphill road. Referring to FIG. 14, when the (n+1)th section is an uphill road, the control target vehicle speed is decreased by setting the target vehicle speed to be less than that of the previous section.

Figure 15:
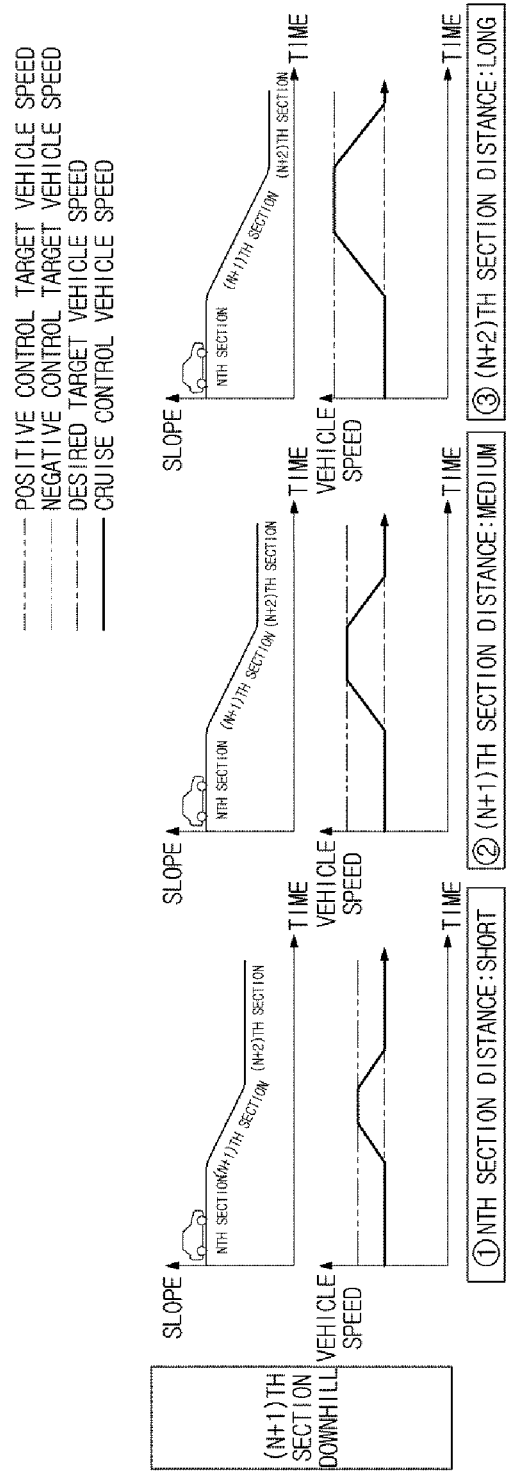
FIG. 15 is a diagram illustrating control target vehicle speeds of the cruise control system in three sections with respect to the distance of the (n+1)th section when the (n+1)th section is a downhill road according to an exemplary embodiment of the present disclosure.

FIG. 15 is a diagram illustrating control target vehicle speeds of the cruise control system in three sections with respect to the distance of the (n+1)th section when the (n+1)th section is a downhill road. Referring to FIG. 15, if the (n+1)th section is a downhill road, the control target vehicle speed may be increased by setting the target vehicle speed to be greater than that of the previous section. In particular, a period of time during which the control target vehicle speed is increased may vary based on the distance of the (n+1)th section.

Figure 16:
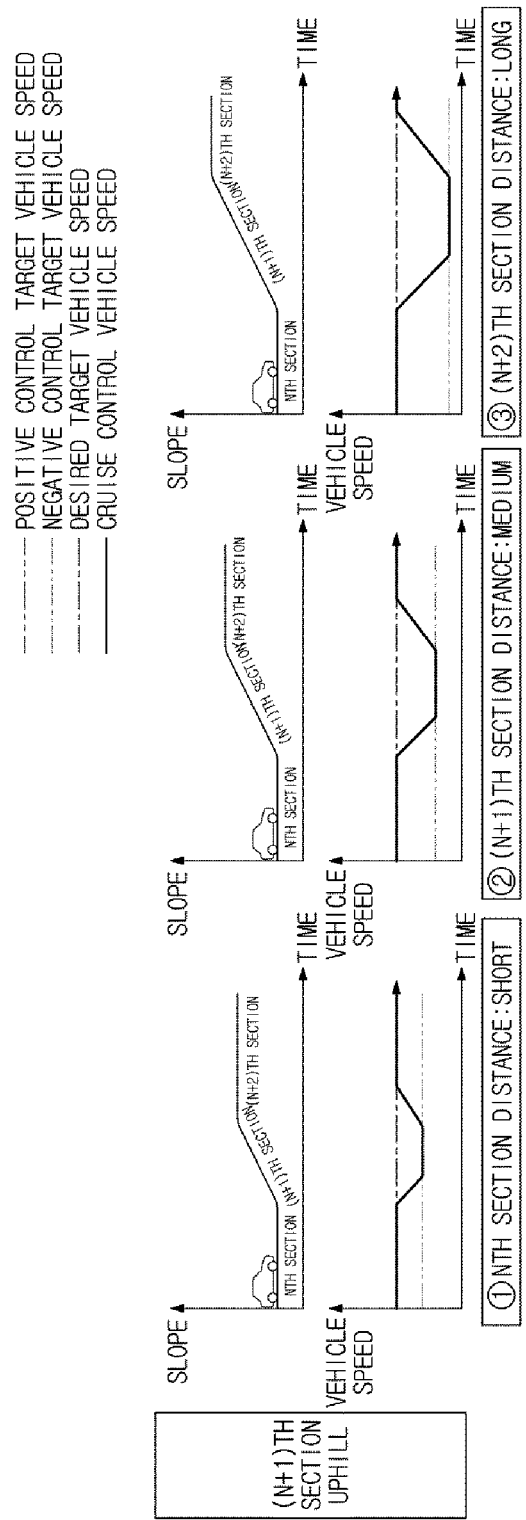
FIG. 16 is a diagram illustrating control target vehicle speeds of the cruise control system in three sections with respect to the distance of the (n+1)th section when the (n+1)th section is an uphill road according to an exemplary embodiment of the present disclosure.

FIG. 16 is a diagram illustrating control target vehicle speeds of the cruise control system in three sections with respect to the distance of the (n+1)th section when the (n+1)th section is an uphill road. Referring to FIG. 16, when the (n+1)th section is an uphill road, the control target vehicle speed may be decreased by setting the target vehicle speed to be less than that of the previous section. In particular, a period of time during which the control target vehicle speed is decreased may vary based on the distance of the (n+1)th section.

Figure 17:
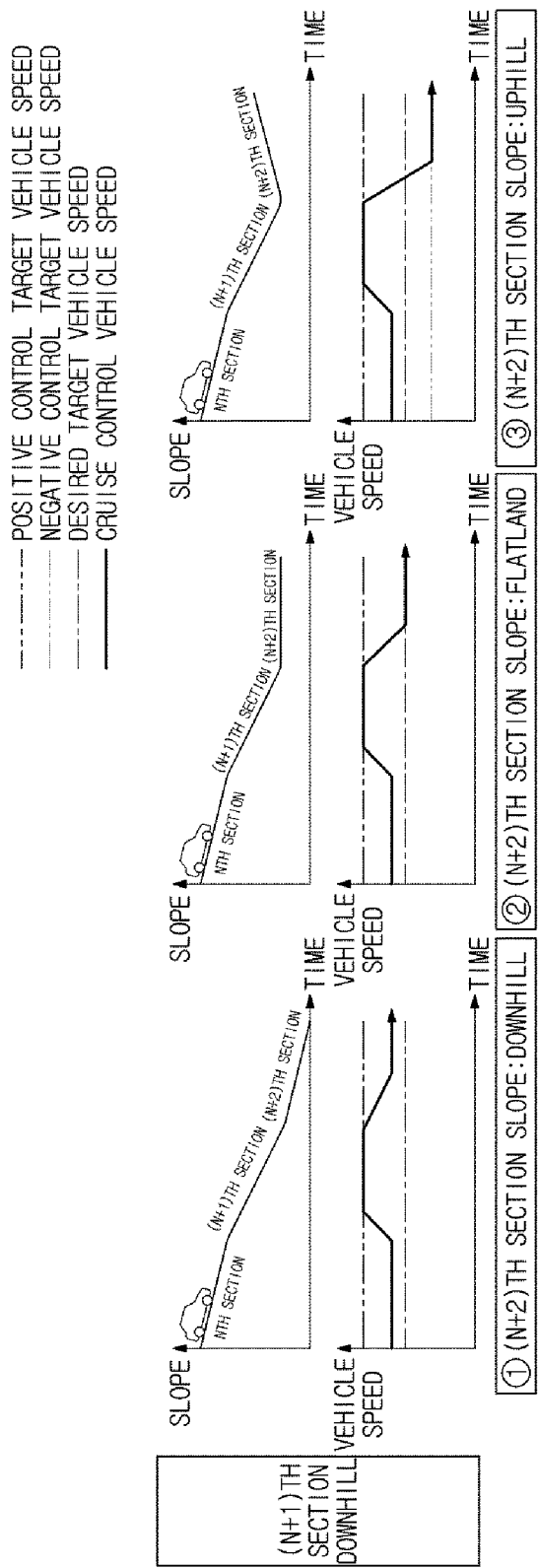
FIG. 17 is a diagram illustrating control target vehicle speeds of the cruise control system in three sections with respect to the slope of the (n+2)th section when both the nth section and the (n+1)th section are downhill roads according to an exemplary embodiment of the present disclosure.

FIG. 17 is a diagram illustrating control target vehicle speeds of the cruise control system in three sections with respect to the slope of the (n+2)th section when both the nth section and the (n+1)th section are downhill roads. As illustrated in FIG. 17, when the (n+1)th section is a downhill road, the target vehicle speed is set to be greater than that of the previous section to increase the control target vehicle speed. Since the nth section is also a downhill road, the control target vehicle speed of the nth section may be set to be greater than a required target vehicle speed. Thus, the control target vehicle speed of the (n+2)th section may be set to be greater than, equal to, or less than a required target vehicle speed based on the slope or incline (e.g., downhill road, flatland, or uphill road) of the (n+2)th section.

Figure 18:
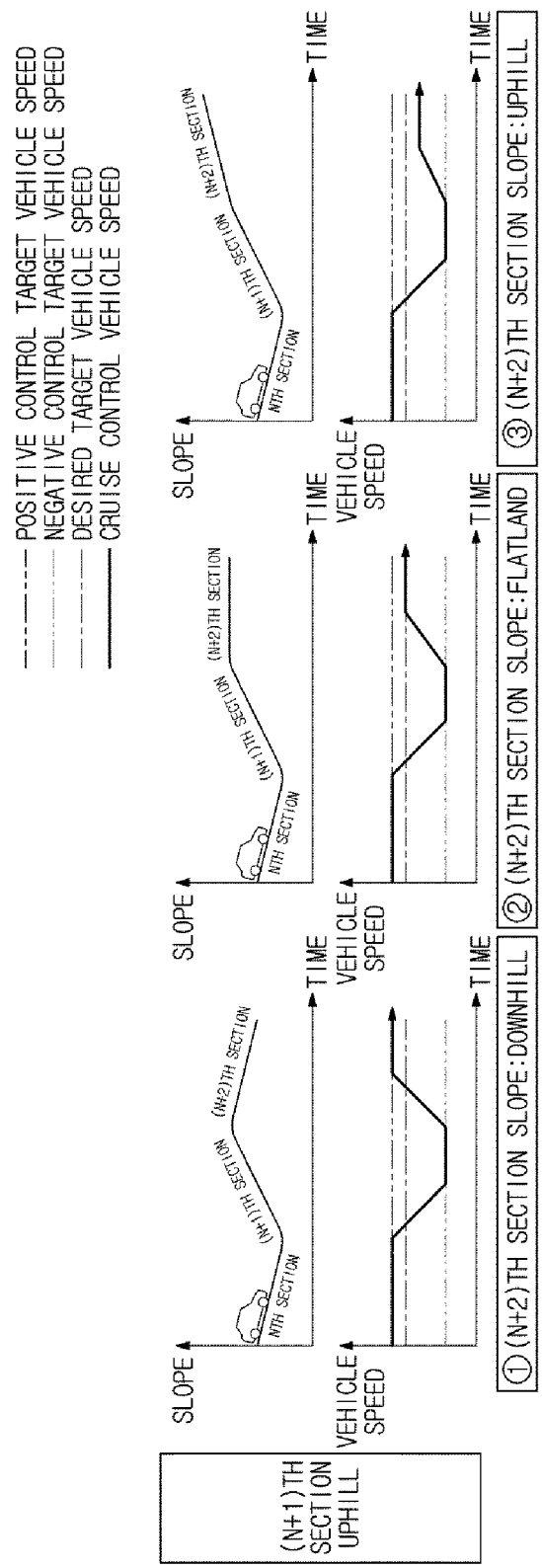
FIG. 18 is a diagram illustrating control target vehicle speeds of the cruise control system in three sections with respect to the slope of the (n+2)th section when the nth section is a downhill road and the (n+1)th section is an uphill road according to an exemplary embodiment of the present disclosure.

FIG. 18 is a diagram illustrating control target vehicle speeds of the cruise control system in three sections with respect to the slope of the (n+2)th section when the nth section is a downhill road and the (n+1)th section is an uphill road. As illustrated in FIG. 18, when the (n+1)th section is an uphill road, the target vehicle speed is set to be less than that of the previous section to decrease the control target vehicle speed. Since the nth section is a downhill road, the control target vehicle speed of the nth section may be set to be greater than a required target vehicle speed. Thus, the control target vehicle speed of the (n+2)th section may be set to be greater than, equal to, or lower than a required target vehicle speed based on the slope (e.g., downhill road, flatland, or uphill road) of the (n+2)th section.

Figure 19:
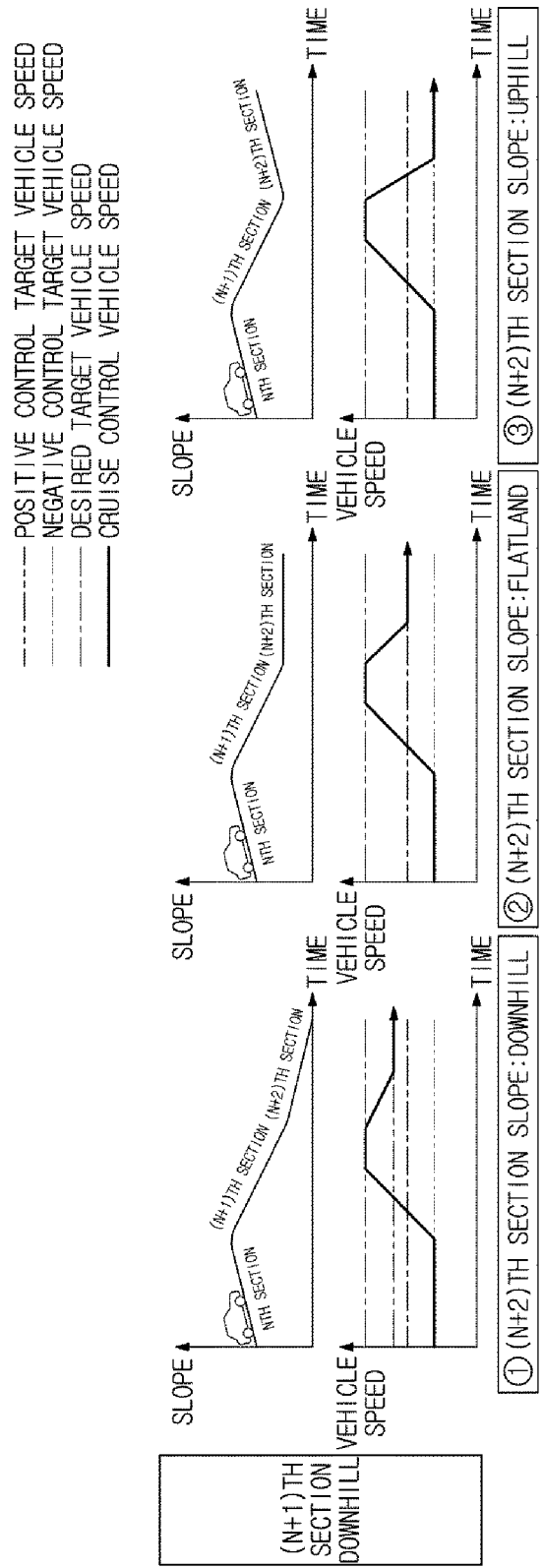
FIG. 19 is a diagram illustrating control target vehicle speeds of the cruise control system in three sections with respect to the slope of the (n+2)th section when the nth section is an uphill road and the (n+1)th section is a downhill road according to an exemplary embodiment of the present disclosure.

FIG. 19 is a diagram illustrating control target vehicle speeds of the cruise control system in three sections with respect to the slope of the (n+2)th section when the nth section is an uphill road and the (n+1)th section is a downhill road. As illustrated in FIG. 19, when the (n+1)th section is a downhill road, the target vehicle speed may be set to be greater than that of the previous section to increase the control target vehicle speed. Since the nth section is an uphill road, the control target vehicle speed of the nth section may be set to be less than a required target vehicle speed. Thus, the control target vehicle speed of the (n+2)th section may be set to be greater than, equal to, or less than a required target vehicle speed based on the slope (e.g., downhill road, flatland, or uphill road) of the (n+2)th section.

Figure 20:
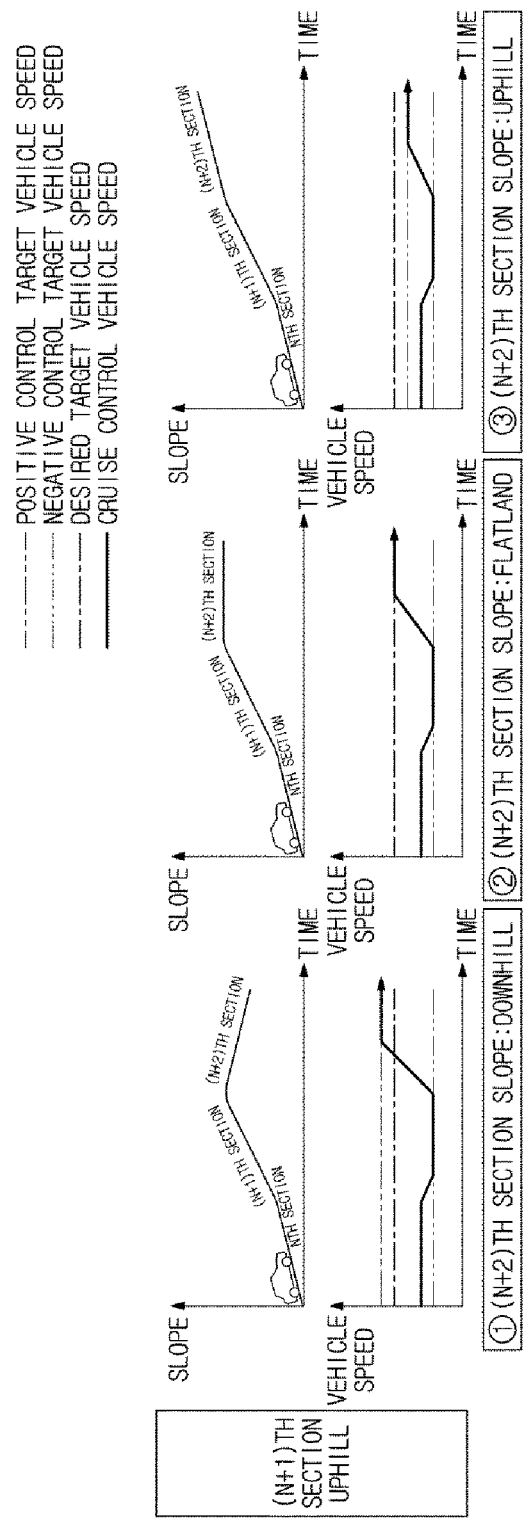
FIG. 20 is a diagram illustrating control target vehicle speeds of the cruise control system in three sections with respect to the slope of the (n+2)th section when both the nth and (n+1)th sections are uphill roads according to an exemplary embodiment of the present disclosure.

FIG. 20 is a diagram illustrating control target vehicle speeds of the cruise control system in three sections with respect to the slope of the (n+2)th section when both the nth and (n+1)th sections are uphill roads. As illustrated in FIG. 20, when the (n+1)th section is an uphill road, the target vehicle speed may be set to be less than that of the previous section to decrease the control target vehicle speed. Since the nth section is also an uphill road, the control target vehicle speed of the nth section may be set to be less than a required target vehicle speed. Thus, the control target vehicle speed of the (n+2)th section may be set to be greater than, equal to, or less than a required target vehicle speed based on the slope (e.g., downhill road, flatland, or uphill road) of the (n+2)th section.

As described above, the cruise control system according to an exemplary embodiment may increase fuel efficiency by increasing, maintaining, or decreasing the control target vehicle speed based on the slope variation of the three consecutive forward sections and the section distance and prevent unintended operation stops on roads with substantial slope variations in advance. Thus, convenience and satisfaction of the driver may be enhanced. Additionally, since the cruise control system prevents unnecessary acceleration or deceleration of a vehicle on roads with substantial slope variations, driving performance may be improved.

Figure 21A:
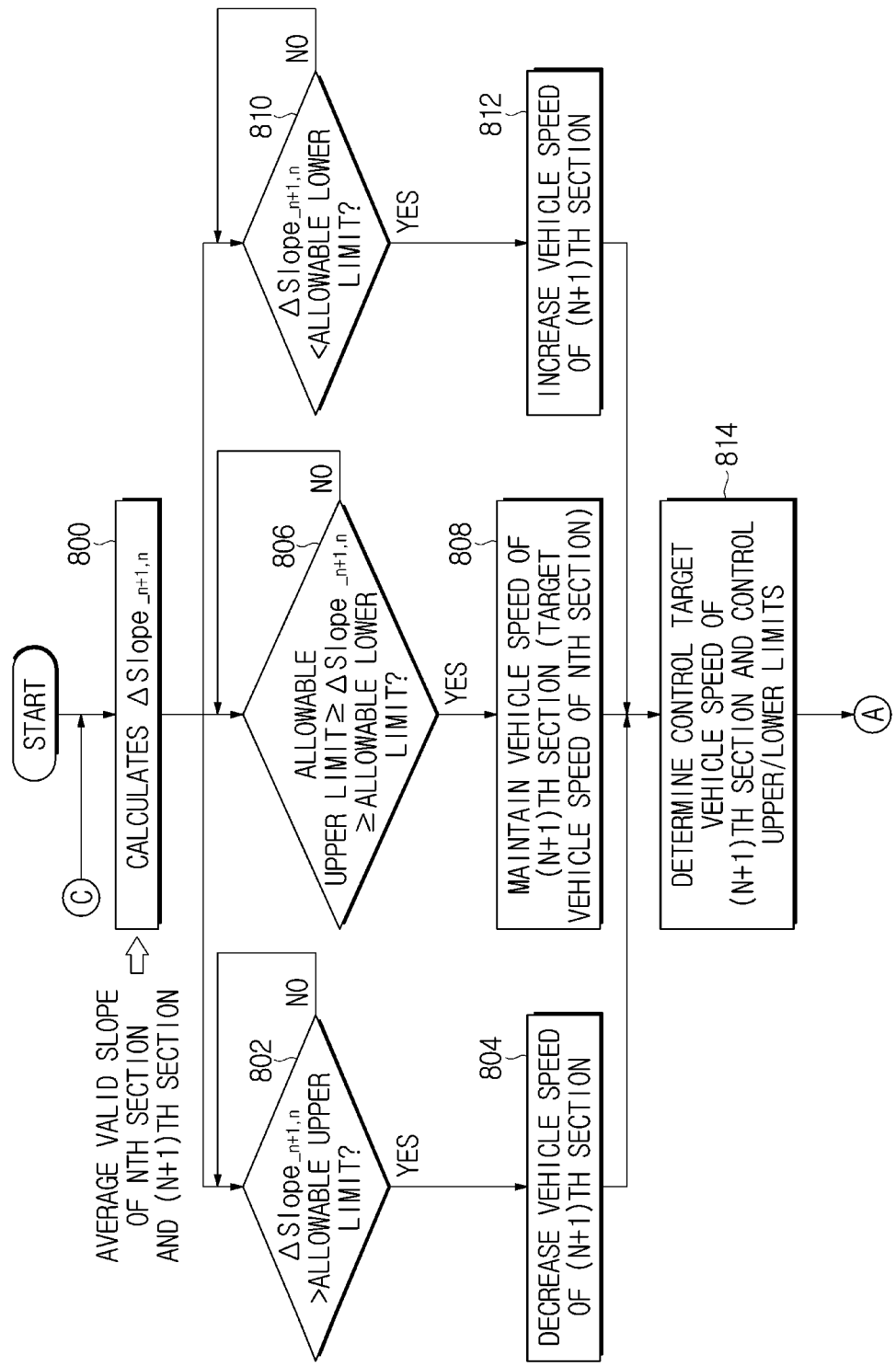
FIGS. 21A to 21C are flowcharts illustrating a method of determining a control target vehicle speed by using an average valid slope of three consecutive forward sections in the vehicle speed control mode according to an exemplary embodiment of the present disclosure.
Figure 21B:
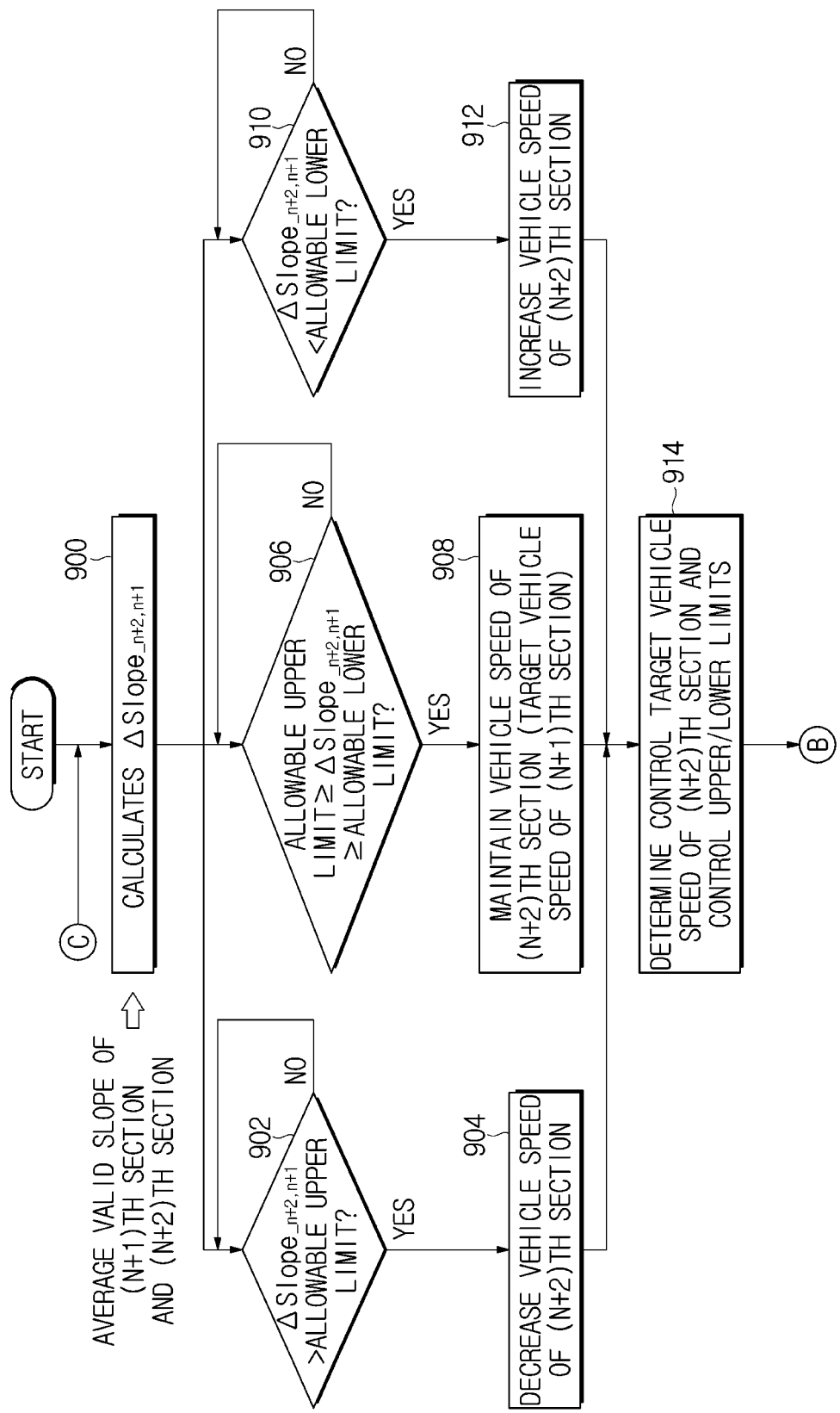
Figure 21C:
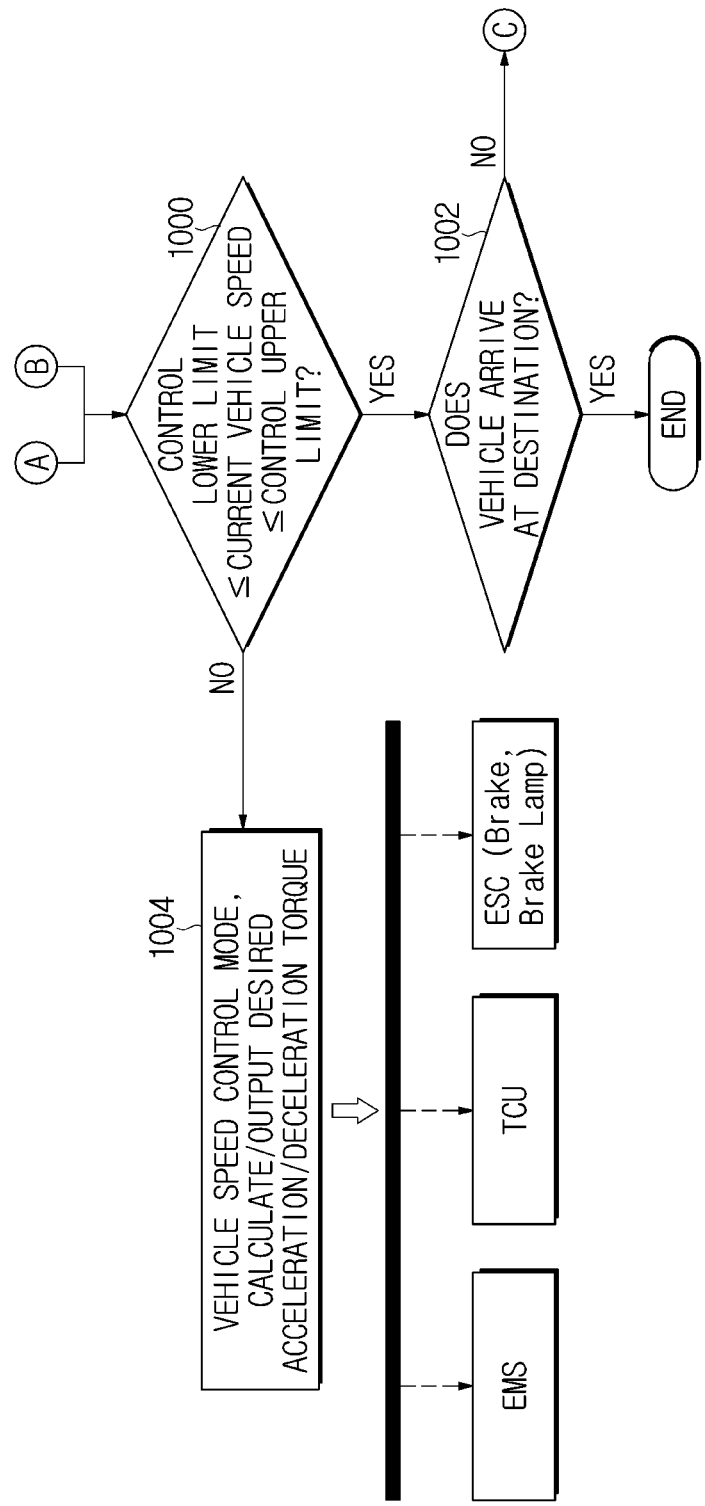

Moreover, a method of determining a control target vehicle speed using an average valid slope of three consecutive forward sections in a vehicle speed control mode according to an exemplary embodiment will be described with reference to FIGS. 21A to 21C. FIGS. 21A to 21C are flowcharts illustrating a method of determining a control target vehicle speed using an average valid slope of three consecutive forward sections in the vehicle speed control mode according to an exemplary embodiment.

Referring to FIGS. 21A to 21C, in the vehicle speed control mode the vehicle speed controller 500 may be configured to calculate a slope variation ($\Delta Slope\_{n+1, n}$) between the nth section and the (n+1) section (800). Particularly, the vehicle speed controller 500 may be configured to determine whether the slope variation ($\Delta Slope\_{n+1, n}$) between the nth section and the (n+1) section is less than an allowable lower limit (802). When the slope variation ($\Delta Slope\_{n+1, n}$) between the nth section and the (n+1) section is less than the allowable lower limit, the vehicle speed controller 500 may be configured to increase the control target vehicle speed of the (n+1)th section (804).

Additionally, the vehicle speed controller 500 may be configured to determine whether the slope variation ($\Delta Slope\_{n+1, n}$) between the nth section and the (n+1) section is equal to or greater than the allowable lower limit and equal to or less than an allowable upper limit (806). When the slope variation ($\Delta Slope\_{n+1, n}$) between the nth section and the (n+1) section is equal to or greater than the allowable lower limit and equal to or less than the allowable upper limit, the vehicle speed controller 500 may be configured to maintain the control target vehicle speed of the (n+1)th section to be the same as the target vehicle speed of the nth section (808).

The vehicle speed controller 500 may further be configured to determine whether the slope variation ($\Delta Slope\_{n+1, n}$) between the nth section and the (n+1) section is greater than the allowable upper limit (810). When the slope variation ($\Delta Slope\_{n+1, n}$) between the nth section and the (n+1) section is greater than the allowable upper limit, the vehicle speed controller 500 may be configured to decrease the control target vehicle speed of the (n+1)th section (812). As described above, the vehicle speed controller 500 may be configured to determine the control target vehicle speeds of the nth section and the (n+1)th section and adjust upper and lower limits using an average valid slope of the nth section and the (n+1)th section (814).

In the vehicle speed control mode, the slope variation ($\Delta Slope\_{n+2, n+1}$) between the (n+1)th section and the (n+2)th section may be calculated (900). The vehicle speed controller 500 may be configured to determine whether the slope variation ($\Delta Slope\_{n+2, n+1}$) between the (n+1)th section and the (n+2)th section is less than an allowable lower limit (902). When the slope variation ($\Delta Slope\_{n+2, n+1}$) between the (n+1)th section and the (n+2)th section is less than the allowable lower limit, the vehicle speed controller 500 may be configured to increase the control target vehicle speed of the (n+2)th section (904).

The vehicle speed controller 500 may also be configured to determine whether the slope variation ($\Delta Slope\_{n+2, n+1}$) between the (n+1)th section and the (n+2)th section is equal to or greater than the allowable lower limit and equal to or less than an allowable upper limit (906). When the slope variation ($\Delta Slope\_{n+2, n+1}$) between the (n+1)th section and the (n+2)th section is equal to or greater than the allowable lower limit and equal to or less than the allowable upper limit, the vehicle speed controller 500 may be configured to maintain the control target vehicle speed of the (n+2)th section to be the same as the target vehicle speed of the (n+1)th section (908).

The vehicle speed controller 500 may be configured to determine whether the slope variation ($\Delta Slope\_{n+2, n+1}$) between the (n+1)th section and the (n+2)th section is greater than the allowable upper limit (910). When the slope variation ($\Delta Slope\_{n+2, n+1}$) between the (n+1)th section and the (n+2)th section is greater than the allowable upper limit, the vehicle speed controller 500 may be configured to decrease the control target vehicle speed of the (n+2)th section (912). As described above, the vehicle speed controller 500 may be configured to determine the control target vehicle speeds of the (n+1)th section and the (n+2)th section and control upper/lower limits using an average valid slope of the (n+1)th section and the (n+2)th section (914).

Accordingly, the vehicle speed controller 500 may be configured to operate the cruise control system of the vehicle 1 using the determined control target vehicle speeds of the nth section and the (n+1)th section and adjust the upper and lower limits thereof and the determined control target vehicle speeds of the (n+1)th section and the (n+2)th section and adjust the upper and lower limits thereof.

When the cruise control system of the vehicle 1 operates in the vehicle speed control mode, the vehicle speed controller 500 may be configured to whether a current vehicle speed is greater than the control lower limit and less than the control upper limit (1000). In response to determining that the current vehicle speed is greater than the control lower limit and less than the control upper limit based on the result of operation 1000, the vehicle speed controller 500 may be configured to determine whether the vehicle 1 reaches the destination by the cruise control system (1002). When the vehicle 1 does not reach the destination, the process returns to operation 800 (or 900) to perform next operations. In response to determining that the vehicle 1 reaches the destination based on the result of operation 1002, the process may be terminated.

Moreover, in response to determining that the current vehicle speed is greater than the control lower limit and not less than the control upper limit based on the results of operation 1000, the vehicle speed controller 500 may be configured to calculate the acceleration torque and the deceleration torque and transmit the acceleration control request (EMS), the upshifting control request (TCU), the coasting operation control request (EMS/TCU), the downshifting control request (TCU), and the deceleration control request (ESC) to the speed-following controller 600. Thus, the speed-following controller 600 may be configured to output the calculated torque and the gear level in response to receiving the request for acceleration or deceleration and gear-shifting from the vehicle speed controller 500 (1004).

As is apparent from the above description, according to the cruise control system, the vehicle including the same, and the method of controlling the cruise control system according to an exemplary embodiment, fuel efficiency may be increased by changing control target vehicle speeds by continuously predicting vehicle speeds and variations in required driving forces on roads with various slope variations (e.g., slopes of uphill/downhill roads and acceleration/deceleration sections), as well as downhill roads. Additionally, driving performance may also be improved by using kinetic energies and preventing unnecessary acceleration/deceleration in comparison with conventional vehicles. The convenience and satisfaction of the driver may be enhanced by preventing an unintended operation stop of the cruise control system caused by frequent acceleration and deceleration on roads with substantial slope variations in advance and by preventing unintended acceleration and deceleration on roads with frequent slope variations.

Although exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A cruise control system, comprising:
    a road model transmission unit configured to analyze map information of a driving route and output a slope model of three consecutive forward sections;
    a vehicle speed controller configured to set a control target vehicle speed using slopes of the three consecutive forward sections and section distances received from the road model transmission unit; and
    a speed-following controller configured to receive a request for acceleration or deceleration and gear-shifting from the vehicle speed controller and maintain the set control target vehicle speed.

2. The cruise control system according to claim 1, wherein the road model transmission unit is a navigation device configured to calculate a linearly simplified road model using information regarding a geometric structure of a road of an advanced driver assistance system (ADAS) map on a driving route and output a road model of the three consecutive forward sections.

3. The cruise control system according to claim 2, wherein the vehicle speed controller is configured to set a control target vehicle speed of an (n+1)th section based on a slope variation ($\Delta Slope\_{n+1, n}$) between an nth section and the (n+1) section and a control target vehicle speed of an (n+2)th section based on a slope variation ($\Delta Slope\_{n+2, n+1}$) between the (n+1)th section and the (n+2)th section using information regarding the three consecutive forward sections (nth section, (n+1)th section, and (n+2)th section) received from the road model transmission unit.

4. The cruise control system according to claim 3, wherein the vehicle speed controller is configured to set the control target vehicle speed to be less than that of a previous section when a slope variation between two sections is positive (+) and the control target vehicle speed to be greater than that of the previous section when the slope variation between the two sections is negative (−).

5. The cruise control system according to claim 2, wherein the vehicle speed controller is configured to calculate a slope variation ($\Delta Slope\_{n+1, n}$) between an nth section and an (n+1) section using information regarding three consecutive forward sections received from the road model transmission unit and decrease the control target vehicle speed of the (n+1)th section by setting the control target vehicle speed of the (n+1)th section to be less than a target vehicle speed of the nth section when the calculated slope variation ($\Delta Slope\_{n+1, n}$) is greater than 0.

6. The cruise control system according to claim 5, wherein the vehicle speed controller is configured to compensate the control target vehicle speed of the (n+1)th section when a negative (−) slope variation ($\Delta Slope\_{n+1, n}$) of the (n+1)th section is less than a predetermined value.

7. The cruise control system according to claim 2, wherein the vehicle speed controller is configured to calculate a slope variation ($\Delta Slope\_{n+1, n}$) between an nth section and an (n+1) section using information regarding the three consecutive forward sections (nth section, (n+1)th section, and (n+2)th section) received from the road model transmission unit and maintain the control target vehicle speed of the (n+1)th section by setting the control target vehicle speed of the (n+1)th section to be the same as a target vehicle speed of the nth section when the calculated slope variation ($\Delta Slope\_{n+1, n}$) is 0.

8. The cruise control system according to claim 2, wherein the vehicle speed controller is configured to calculate a slope variation ($\Delta Slope\_{n+1, n}$) between an nth section and an (n+1) section using information regarding the three consecutive forward sections (nth section, (n+1)th section, and (n+2)th section) received from the road model transmission unit and increase the control target vehicle speed of the (n+1)th section by setting the control target vehicle speed of the (n+1)th section to be greater than a target vehicle speed of the nth section when the calculated slope variation ($\Delta Slope\_{n+1, n}$) is less than 0.

9. The cruise control system according to claim 8, wherein the vehicle speed controller is configured to compensate the control target vehicle speed of the (n+1)th section when a positive (+) slope variation ($\Delta Slope\_{n+1, n}$) of the (n+1)th section is greater than a predetermined value.

10. The cruise control system according to claim 2, wherein the vehicle speed controller is configured to calculate a slope variation ($\Delta Slope\_{n+2, n+1}$) between an (n+1)th section and an (n+2)th section using information regarding the three consecutive forward sections (nth section, (n+1)th section, and (n+2)th section) received from the road model transmission unit and decrease the control target vehicle speed of the (n+2)th section by setting the control target vehicle speed of the (n+2)th section to be less than a target vehicle speed of the (n+1)th section when the calculated slope variation ($\Delta Slope\_{n+2, n+1}$) is greater than 0.

11. The cruise control system according to claim 2, wherein the vehicle speed controller is configured to calculate a slope variation ($\Delta Slope\_{n+2, n+1}$) between an (n+1)th section and an (n+2)th section using information regarding three consecutive forward sections (nth section, (n+1)th section, and (n+2)th section) received from the road model transmission unit and maintain the control target vehicle speed of the (n+2)th section by setting the control target vehicle speed of the (n+2)th section to be the same as a target vehicle speed of the (n+1)th section when the calculated slope variation ($\Delta Slope\_{n+2, n+1}$) is 0.

12. The cruise control system according to claim 2, wherein the vehicle speed controller is configured to calculate a slope variation ($\Delta Slope\_{n+2, n+1}$) between an (n+1)th section and an (n+2)th section using information regarding the three consecutive forward sections (nth section, (n+1)th section, and (n+2)th section) received from the road model transmission unit and increase the control target vehicle speed of the (n+2)th section by setting the control target vehicle speed of the (n+2)th section to be greater than a target vehicle speed of the (n+1)th section when the calculated slope variation ($\Delta Slope\_{n+2, n+1}$) is less than 0.

13. The cruise control system according to claim 1, wherein the vehicle speed controller is configured to transmit a signal to execute and adjust acceleration or deceleration and gear-shifting to the speed-following controller to maintain the set control target vehicle speed.

14. A cruise control system, comprising:
a road model transmission unit configured to calculate a linearly simplified road model using map information of a driving route and output a slope model of three consecutive forward sections (nth section, (n+1)th section, and (n+2)th section);
a vehicle speed controller configured to calculate a slope variation ($\Delta Slope\_{n+1, n}$) between the nth section and the (n+1) section and a slope variation ($\Delta Slope\_{n+2, n+1}$) between the (n+1)th section and the (n+2)th section using slope information regarding the three consecutive forward sections received from the road model transmission unit and to set control target vehicle speeds of the (n+1)th section and the (n+2)th section based on the calculated slope variations (($\Delta Slope\_{n+1, n}$) and ($\Delta Slope\_{n+2, n+1}$)); and
a speed-following controller configured to receive a request for acceleration or deceleration and gear-shifting from the vehicle speed controller and maintain the set control target vehicle speeds of the (n+1)th section and the (n+2)th section.

15. The cruise control system according to claim 14, wherein the vehicle speed controller is configured to calculate an acceleration torque and a deceleration torque based on the set control target vehicle speeds of the (n+1)th section and the (n+2)th section and transmit an acceleration control request (EMS), an upshifting control request (TCU), a coasting operation control request (EMS/TCU), a downshifting control request (TCU), and a deceleration control request (ESC) to the speed-following controller.

16. A vehicle comprising a cruise control system, wherein the cruise control system comprises:
a road model transmission unit configured to analyze map information of a driving route and output a slope model of three consecutive forward sections;
a vehicle speed controller configured to set a control target vehicle speed using slopes of the three consecutive forward sections and section distances received from the road model transmission unit; and
a speed-following controller configured to receive a request for acceleration or deceleration and gear-shifting from the vehicle speed controller and maintain the set control target vehicle speed.

17. A method of controlling a cruise control system, comprising:

outputting, by a controller, a slope model of three consecutive forward sections (nth section, (n+1)th section, and (n+2)th section) by calculating a linearly simplified road model using map information of a driving route;

calculating, by the controller, a slope variation ($\Delta Slope\_{n+1, n}$) between the nth section and the (n+1) section and a slope variation ($\Delta Slope\_{n+2, n+1}$) between the (n+1)th section and the (n+2)th section using slope information of the three consecutive forward sections;

setting, by the controller, control target vehicle speeds of the (n+1)th section and the (n+2)th section based on the calculated slope variations (($\Delta Slope\_{n+1, n}$) and ($\Delta Slope\_{n+2, n+1}$));

requesting, by the controller, acceleration or deceleration and gear-shifting by calculating acceleration/deceleration torques based on the set control target vehicle speeds of the (n+1)th section and the (n+2)th section; and outputting, by the controller, the acceleration torque or the deceleration torque and gear levels in response to receiving the request for acceleration or deceleration and gear-shifting.

18. The method according to claim 17, wherein the setting of the control target vehicle speed of the (n+1)th section is performed by increasing the control target vehicle speed of the (n+1)th section by setting the control target vehicle speed of the (n+1)th section to be greater than a target vehicle speed of the nth section when the calculated slope variation ($\Delta Slope\_{n+1, n}$) is less than an allowable lower limit.

19. The method according to claim 17, wherein the setting of the control target vehicle speed of the (n+1)th section is performed by decreasing the control target vehicle speed of the (n+1)th section by setting the control target vehicle speed of the (n+1)th section to be less than a target vehicle speed of the nth section when the calculated slope variation ($\Delta Slope\_{n+1, n}$) is greater than an allowable upper limit.

20. The method according to claim 17, wherein the setting of the control target vehicle speed of the (n+1)th section is performed by maintaining the control target vehicle speed of the (n+1)th section to be the same as a target vehicle speed of the nth section when the calculated slope variation ($\Delta Slope\_{n+1, n}$) is greater than an allowable lower limit and less than an allowable upper limit.

* * * * *